United States Patent
Seo et al.

(10) Patent No.: US 7,778,141 B2
(45) Date of Patent: Aug. 17, 2010

(54) OPTICAL PICKUP, OPTICAL DISC DEVICE, POLARIZATION ADJUSTMENT PLATE, AND OPTICAL DEVICE

(75) Inventors: Katsuhiro Seo, Kanagawa (JP); Takashi Kobayashi, Kanagawa (JP); Yoshiki Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 11/932,200

(22) Filed: Oct. 31, 2007

(65) Prior Publication Data

US 2008/0151735 A1 Jun. 26, 2008

(30) Foreign Application Priority Data

Nov. 1, 2006 (JP) ............................. 2006-298151

(51) Int. Cl.
*G11B 7/00* (2006.01)

(52) U.S. Cl. .................... 369/112.16; 369/112.21; 369/110.03; 369/44.12

(58) Field of Classification Search ................. None
See application file for complete search history.

(56) References Cited

U.S. PATENT DOCUMENTS 6,625,102 B1 * 9/2003 Hashimoto ............ 369/112.16
7,260,033 B2 * 8/2007 Shimano et al. .......... 369/44.37
2006/0250933 A1 * 11/2006 Asada et al. ........... 369/112.01

FOREIGN PATENT DOCUMENTS

JP 2006-185474 7/2006

* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

The present invention can simplify the configuration of a polarization adjustment plate. According to the present invention, the crystal axis of the polarization adjustment wavelength plate 32 is so arranged as to be turned up from the X-Y plane being an orthogonal plane with respect to the optical axis 40a, and the wavelength dependence which the crystal material is originally provided with is largely expressed, and further the thickness "ta" with respect to the optical axis 40a is set up such that the phase difference Δ to be brought about at the beam center becomes low from 360°+180°=540° being a desired design value to irradiate the optical beam as the P-polarization by a predetermined difference value or 60°.

14 Claims, 41 Drawing Sheets

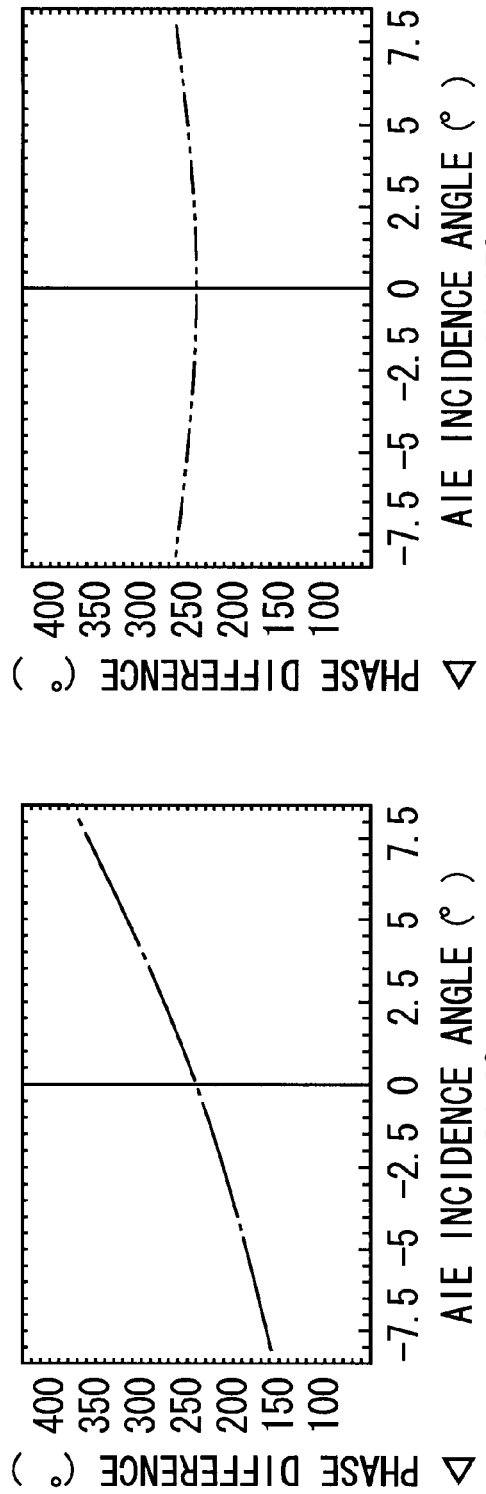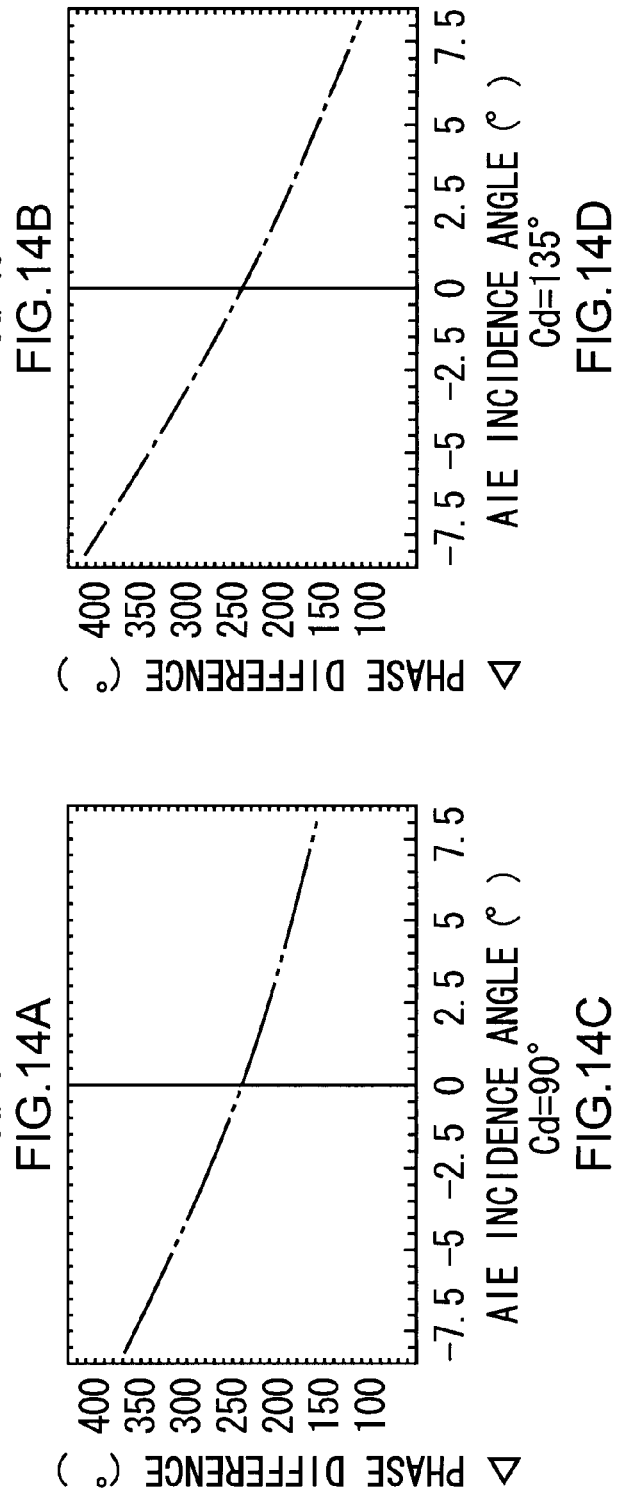
FIG.14A Cd=0°
FIG.14B Cd=45°
FIG.14C Cd=90°
FIG.14D Cd=135°

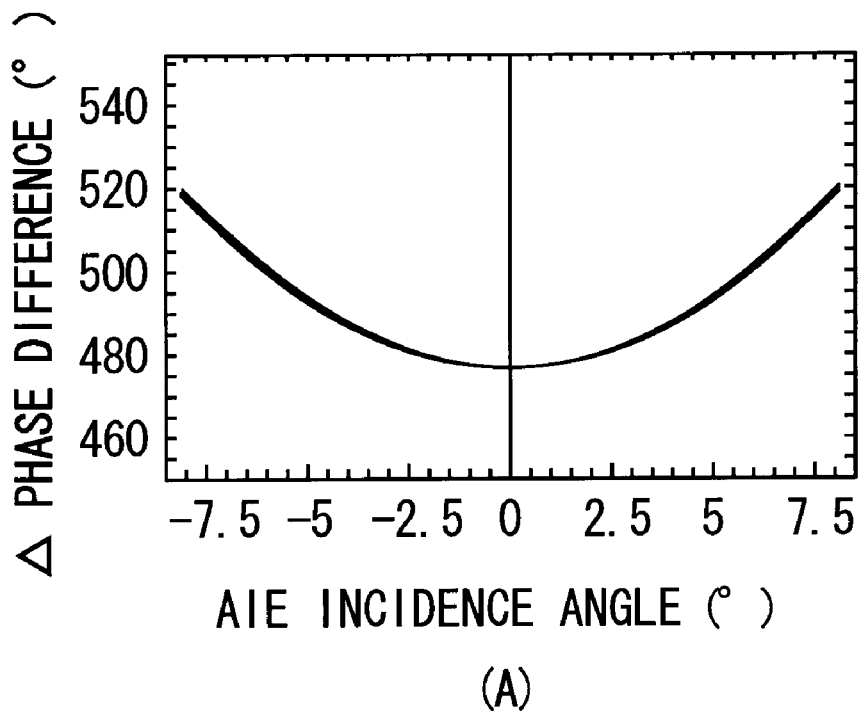
(A)
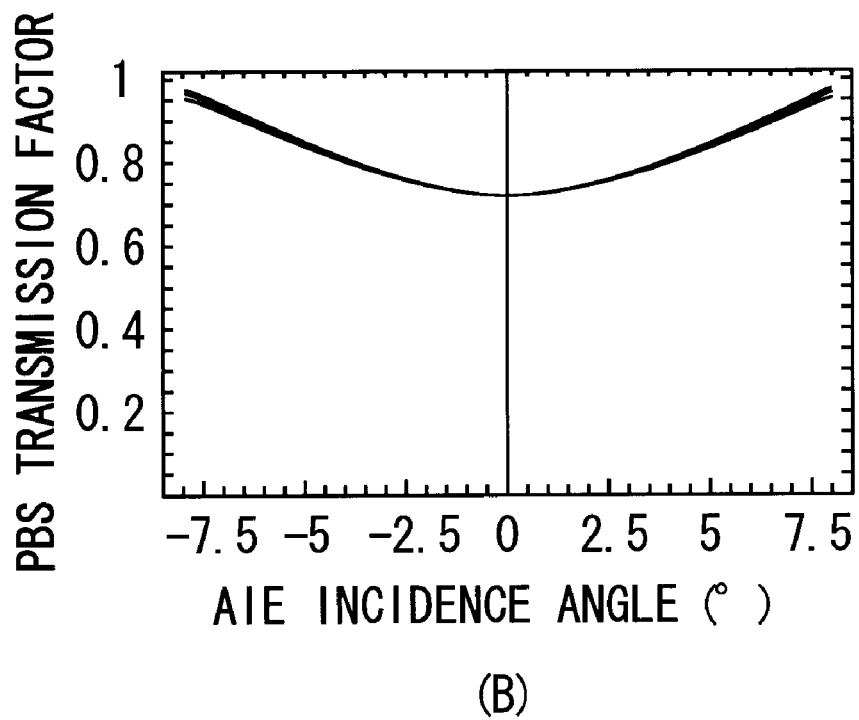
(B)
FIG.15 ta=0.6[mm]
φ=±12.5°
△=480°

Cd=45° ta=0.15 [mm]
φ=±25.8°
△=480°

Cd=135°

Cd=45° ta=0.05 [mm]
φ=±48.8°
△=480°

Cd=135° ta = 0.8 [mm]
$\phi$ = ±14.5°
$\Delta$ = 840°

Cd=45° ta = 0.8 [mm]
φ = ±17.3°
Δ = 1200°

Cd=135° ta = 0.4 [mm]
φ = ±24.9°
Δ = 1200°

$ta = 0.1$ [mm]
$\phi = \pm 57.3°$
$\Delta = 1200°$

OPTICAL PICKUP, OPTICAL DISC DEVICE, POLARIZATION ADJUSTMENT PLATE, AND OPTICAL DEVICE

CROSS REFERENCES TO RELATED APPLICATIONS

The present invention contains subject matter related to Japanese Patent Application JP2006-298151 filed in the Japanese Patent Office on Nov. 1, 2006, the entire contents of which being incorporated herein by reference.

BACKGROUND OF THE INVENTION

1. Field of the Invention

The present invention relates to an optical pickup, an optical disc device, a polarization adjustment plate, and an optical device, which are desirably applied to an optical disc device that uses a laser diode as a light source, for example.

2. Description of the Related Art

In an optical disc device, by irradiating a laser beam from a laser diode to an optical disc, information is reproduced from or recorded to the optical disc.

As shown in FIG. 1, the light intensity of a laser beam 2 irradiated from a laser diode substantially expresses the Gaussian distribution, and only the central part of the laser beam 2 whose light intensity is large is made to go into the optical path in an optical pickup to be used as an optical beam. The light intensity distribution along a direction parallel with the active layer of the laser diode (referred to as $\theta//$ direction, hereinafter) is largely different from that along a direction perpendicular to the active layer (referred to as $\theta\perp$ direction, hereinafter).

In case of directly making the optical beam go into the optical path in the optical pickup, as shown in FIG. 2B, with respect to the $\theta\perp$ direction of the optical beam, since the optical disc device can make only part of the optical beam whose intensity is large and intensity distribution is flat go to an objective lens and set up an incidence region IE$\theta\perp$, a light intensity distribution in which the ratio of the rim intensity RM indicative of the light intensity of the rim part of the objective lens with respect to the central light intensity Ps of the optical beam (referred to as rim intensity ratio, hereinafter) is large to some extent can be obtained, which can reduce the spot size.

On the other hand, as shown in FIG. 2A and FIG. 3A, with respect to the $\theta//$ direction of the optical beam, since the optical disc device makes also part of the optical beam whose intensity is small and intensity distribution is steep go to an objective lens and sets up an incidence region Ie$\theta//$, the rim intensity RM of the optical beam becomes extremely small, and accordingly the rim intensity ratio becomes small, which undesirably enlarge the spot size of the optical beam to be irradiated to an optical disc.

As shown in FIG. 3B, in the optical disc device, by setting the distance from the laser diode 1 to a collimator lens 25 long, since only the central part of the laser beam 2 can be made to go to an objective lens 27 after widely diffusing the laser beam 2, the rim intensity ratio in the $\theta//$ direction can be made large. On the other hand, of the laser beam 2, part which is not made to go to the objective lens 27 is increased, which undesirably reduces the light use efficiency.

There is known an optical disc device in which a wavelength plate is divided into three regions, and part of an optical beam transmitting the central part thereof is converted from the P-polarization to the S-polarization, while both end parts of the optical beam transmitting both the end regions thereof are made to transmit in the intact state of the P-polarization, and part of the central part of the optical beam of the elliptical polarization is reflected by a polarization beam splitter. Accordingly, only the light amount of the central part of the optical beam transmitting the polarization beam splitter is reduced (for example, refer to Patent Document 1: Jpn. Pat. Appln. Laid-Open Publication No. 2006-185474).

SUMMARY OF THE INVENTION

In thus configured optical disc device, since the wavelength plate is divided into three regions, elements configuring three regions have to be put together, which raises a problem that producing the wavelength plate becomes significantly difficult.

In view of the above-identified circumstances, it is therefore desirable to provide a polarization adjustment wavelength plate of simplified configuration, and an optical pickup, an optical disc device, and an optical device which use the polarization adjustment wavelength plate.

According to an embodiment of the present invention, there is provided an optical pickup including: a light source that irradiates an optical beam being a divergent beam; a polarization adjustment plate made of crystal material provided with the birefringence, in which the crystal axis, along which direction the birefringence is not brought about, is so arranged as to be turned up from an orthogonal plane perpendicular to the optical axis of the optical beam to express the incidence angle dependence which the crystal material is provided with, and the thickness with respect to the optical axis is set up such that the phase difference to be brought about at the central part of the optical beam becomes low from a desired design value to make the optical beam emitted as a first linear polarization by a predetermined difference value, and which adjusts the ratio of the first linear polarization and a second linear polarization perpendicular to the first linear polarization such that the ratio of the first linear polarization at the rim part of the optical beam comes to be higher than that at the central part of the optical beam; a polarization beam splitter that splits off the first linear polarization and the second linear polarization in the adjusted optical beam; and an objective lens that condenses the first linear polarization, and makes the condensed first linear polarization go to an optical disc.

Accordingly, by setting up the thickness of the crystal material and the angle of the crystal axis, the light intensity at the central part of the first linear polarization directed to the objective lens as an optical beam can be reduced, which makes it possible to improve the ratio of the light intensity at the rim part of the optical beam with respect to the light intensity at the central part of the optical beam without forming a plurality of regions on the polarization adjustment wavelength plate.

According to an embodiment of the present invention, there is also provided a polarization adjustment plate made of crystal material provided with the birefringence, in which the crystal axis, along which direction the birefringence is not brought about, is so arranged as to be turned up from an orthogonal plane perpendicular to the optical axis of an incoming optical beam to express the incidence angle dependence which the crystal material is provided with, and the thickness with respect to the optical axis is set up such that the phase difference to be brought about at the central part of the optical beam becomes low from a desired design value to make the optical beam emitted as a first linear polarization by a predetermined difference value, and which adjusts the ratio of the first linear polarization and a second linear polarization perpendicular to the first linear polarization such that the ratio of the first linear polarization at the rim part of the optical beam comes to be higher than that at the central part of the optical beam.

Accordingly, by splitting off the first linear polarization and the second linear polarization to use the first linear polarization as an optical beam, the light intensity at the central part of the optical beam can be reduced, which makes it possible to improve the ratio of the light intensity at the rim part of the optical beam with respect to the light intensity at the central part of the optical beam by setting up the thickness of the crystal material and the angle of the crystal axis without forming a plurality of regions on the polarization adjustment wavelength plate.

According to an embodiment of the present invention, there is also provided an optical device including: a light source that irradiates an optical beam being a divergent beam; a polarization adjustment plate made of crystal material provided with the birefringence, in which the crystal axis, along which direction the birefringence is not brought about, is so arranged as to be turned up from an orthogonal plane perpendicular to the optical axis of the optical beam to express the incidence angle dependence which the crystal material is provided with, and the thickness with respect to the optical axis is set up such that the phase difference to be brought about at the central part of the optical beam becomes low from a desired design value to make the optical beam emitted as a first linear polarization by a predetermined difference value, and which adjusts the ratio of the first linear polarization and a second linear polarization perpendicular to the first linear polarization such that the ratio of the first linear polarization at the rim part of the optical beam comes to be higher than that at the central part of the optical beam; and a polarization beam splitter that splits off the first linear polarization and the second linear polarization in the adjusted optical beam.

Accordingly, by using the first linear polarization as an optical beam, the light intensity at the central part of the optical beam being the first linear polarization can be reduced by setting up the thickness of the crystal material and the angle of the crystal axis, which makes it possible to improve the ratio of the light intensity at the rim part of the optical beam with respect to the light intensity at the central part of the optical beam without forming a plurality of regions on the polarization adjustment wavelength plate.

According to the present invention, by setting up the thickness of the crystal material and the angle of the crystal axis, the light intensity at the central part of the first linear polarization directed to the objective lens as an optical beam can be reduced, which makes it possible to improve the ratio of the light intensity at the rim part of the optical beam with respect to the light intensity at the central part of the optical beam without forming a plurality of regions on the polarization adjustment wavelength plate. Accordingly, it becomes possible to realize an optical pickup and an optical disc device using a polarization adjustment wavelength plate of simplified configuration.

According to the present invention, by splitting off the first linear polarization and the second linear polarization to use the first linear polarization as an optical beam, the light intensity at the central part of the optical beam can be reduced, which makes it possible to improve the ratio of the light intensity at the rim part of the optical beam with respect to the light intensity at the central part of the optical beam by setting up the thickness of the crystal material and the angle of the crystal axis without forming a plurality of regions on the polarization adjustment wavelength plate. Accordingly, it becomes possible to realize a polarization adjustment wavelength plate of simplified configuration.

According to the present invention, by using the first linear polarization as an optical beam, the light intensity at the central part of the optical beam being the first linear polarization can be reduced by setting up the thickness of the crystal material and the angle of the crystal axis, which makes it possible to improve the ratio of the light intensity at the rim part of the optical beam with respect to the light intensity at the central part of the optical beam without forming a plurality of regions on the polarization adjustment wavelength plate. Accordingly, it becomes possible to realize an optical device using a polarization adjustment wavelength plate of simplified configuration.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 14A to FIG. 14D show graphs indicative of the incidence angle dependence (2) with respect to the phase difference of the first sub wavelength plate;

FIG. 15A and FIG. 15B show graphs indicative of the incidence angle dependence of the phase difference and the incidence angle dependence of the PBS transmission factor;

DETAILED DESCRIPTION OF THE PREFERRED EMBODIMENTS

Now, one embodiment of the present invention will be described in greater detail by referring to the accompanying drawings.

(1) First Embodiment (1-1) Overall Configuration

Figure 1:
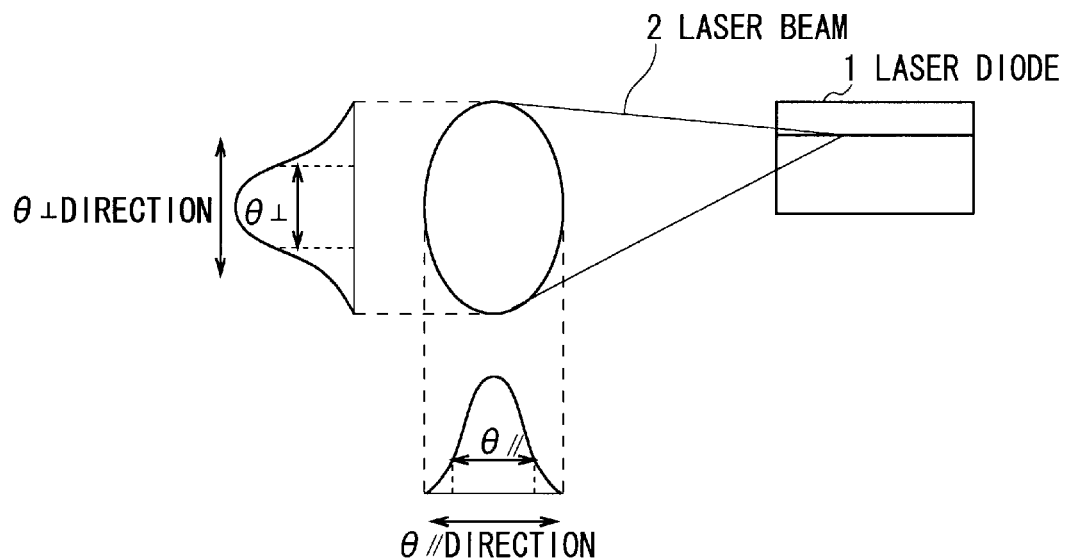
FIG. 1 shows a schematic view to explain the irradiation by a laser diode.
Figures 2A, 2B:
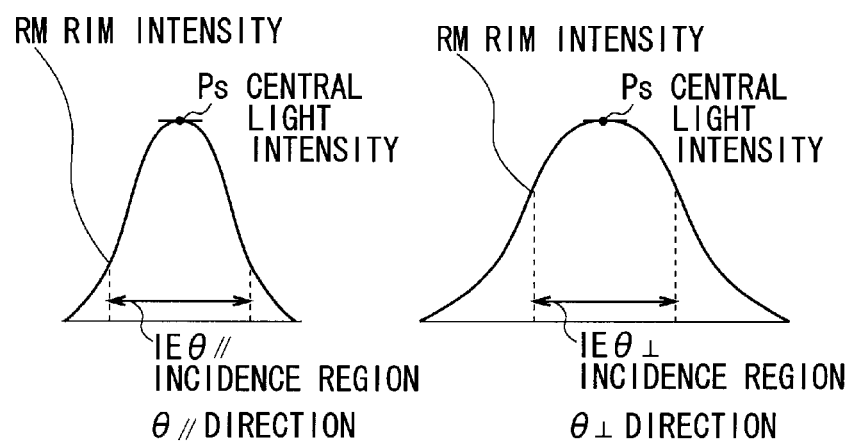
FIG. 2A and FIG. 2B show schematic views to explain the light intensity distribution of a laser beam.
Figure 3:
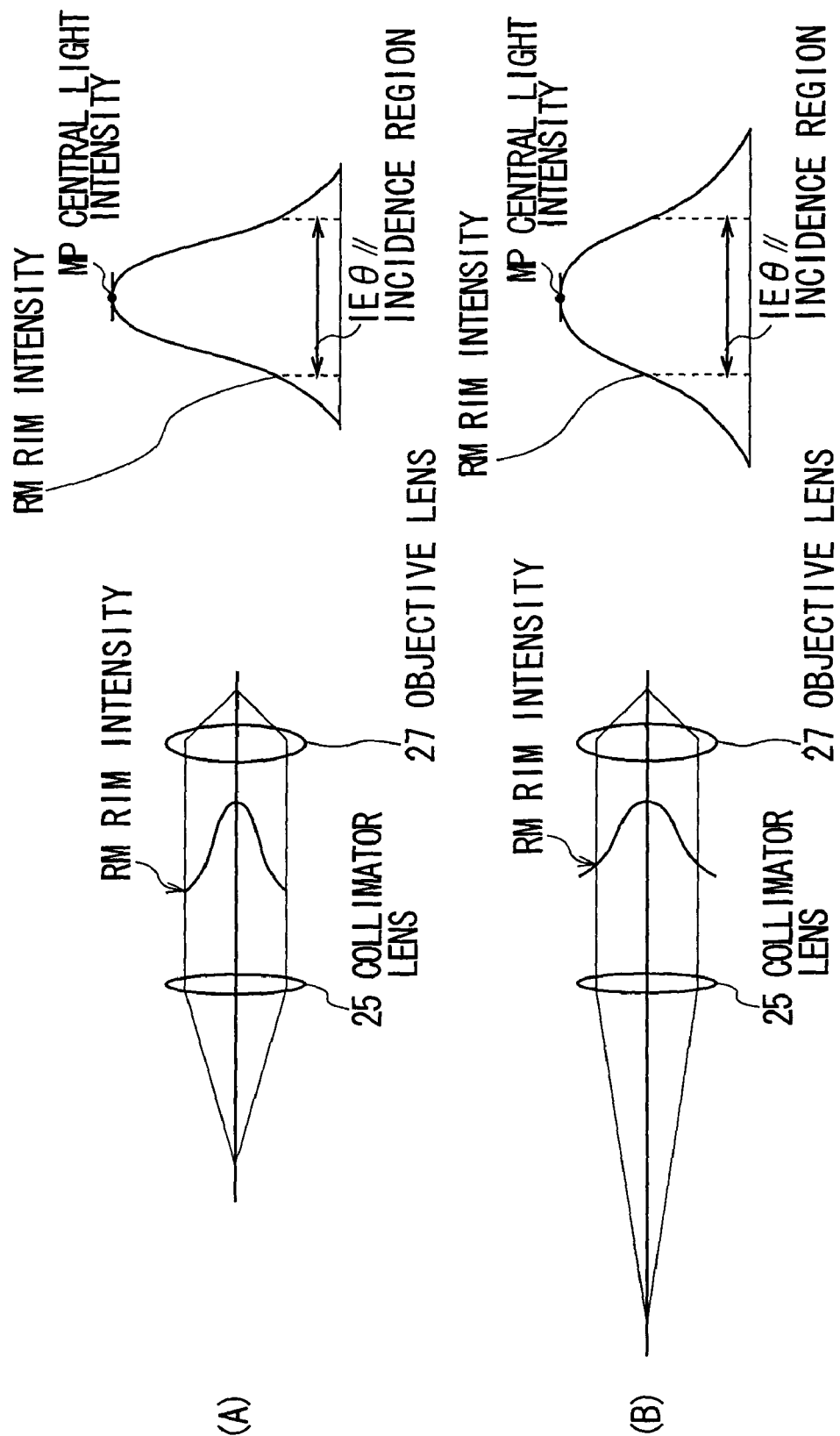
FIG. 3A and FIG. 3B show schematic views to explain the focal distance of a collimator lens and rim intensity.
Figure 4:
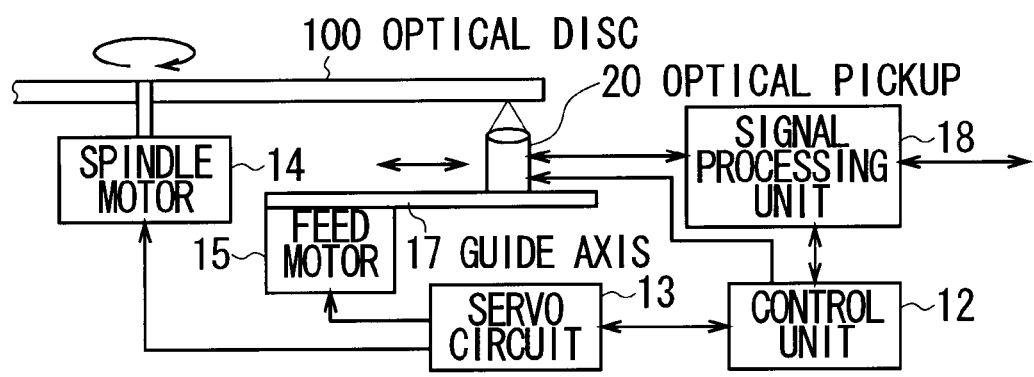
FIG. 4 shows a block diagram indicative of the entire configuration of an optical disc device.

In FIG. 4, a reference numeral 10 represents an optical disc device in this entire embodiment, and parts or components similar to those shown in FIG. 1 to FIGS. 3A, 3B are indicated with the same reference numerals.

The optical disc device 10 includes a control unit 12. The control unit 12 is composed of a Central Processing Unit (CPU), a Read Only Memory (ROM) in which various programs etc. are stored, a Random Access Memory (RAM) that is used as a work memory of the CPC, which are not shown, and controls various units of the optical disc device 10.

That is, the control unit 12 drives a spindle motor 14 through a servo circuit 13, and rotates an optical disc 100 placed on a turntable, not shown. Furthermore, the control unit 12 drives a feed motor 15 through the servo circuit 13 to shift an optical pickup 20 in the tracking direction being the radial direction of the optical disc 100 along a guide axis 17. Moreover, the control unit 12 controls the optical pickup 20 to perform the reproduction processing as well as record processing with respect to the optical disc 100.

Figure 5:
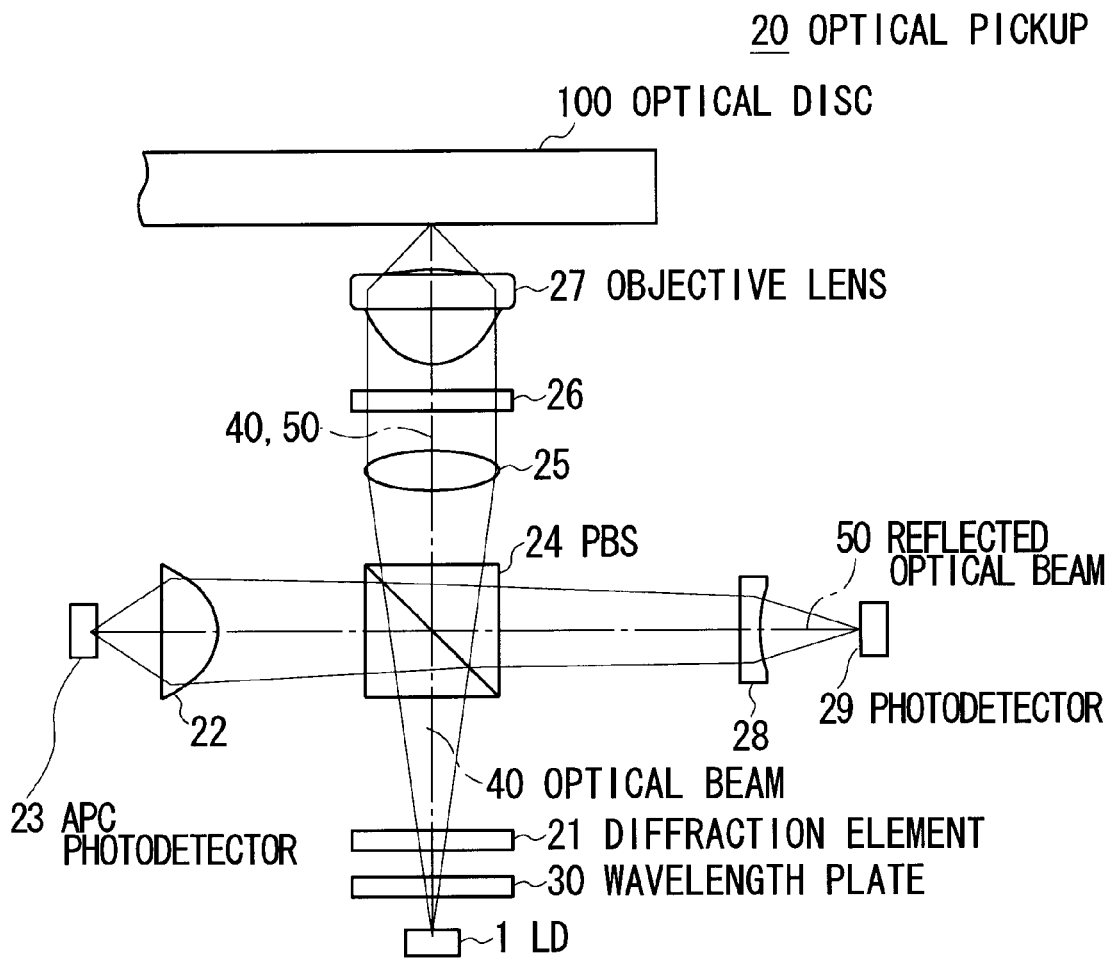
FIG. 5 shows a schematic view indicative of the configuration of an optical pickup.

As shown in FIG. 5, the laser diode 1 of the optical pickup 20 irradiates the laser beam 2 of the linear polarization of 405 nm corresponding to the format of the optical disc 100 which is, for example, a Blu-ray Disc (BD, registered trademark) with a light amount according to the control of the control unit 12, and makes the laser beam 2 go to a diffraction element 21 through a wavelength plate 30 to be described later.

The diffraction element 21 separates the laser beam 2 into a main beam to be used for the reproduction as well as record processing for the optical disc 100, and a sub beam to be used for generating various tracking control signals, and makes the main beam and sub beam go to a polarization beam splitter (referred to as PBS, hereinafter) 24 as an optical beam 40.

The PBS 24 makes the most part of the incoming optical beam 40 transmit therethrough directly, and makes the beam go to the collimator lens 25. The collimator lens 25 converts the incoming optical beam 40 from a divergent beam to a parallel beam, and makes the resulting beam go to a quarter wavelength plate 26.

The quarter wavelength plate 26 converts the optical beam 40 from the linear polarization to the circular polarization, and makes the resulting beam go to the objective lens 27. Then, the objective lens 27 condenses the optical beam 40, and makes the beam go to the optical disc 100.

Furthermore, the objective lens 27 receives a reflected optical beam 50 which is obtained when the optical beam 40 is reflected by the optical disc 100, and makes the beam go to the quarter wavelength plate 26. The quarter wavelength plate 26 converts the reflected optical beam 50 from the circular polarization to the linear polarization, and makes the resulting beam go to the PBS 24 through the collimator lens 25.

The PBS 24 reflects the incoming reflected optical beam 50 using the polarization plane thereof to change the traveling direction of the beam by 90°, and makes the beam go to a photodetector 29 through a multi-lens 28 that compensates the aberration. Then, the photodetector 29 performs the photoelectric conversion with respect to the reflected optical beam 50 to generate a detection signal, and supplies the signal to a signal processing unit 18 (FIG. 4).

The signal processing unit 18 generates a reproduction RF signal and various servo control signals from the detection signal. The control unit 12 generates a drive control signal based on the servo control signals supplied from the signal processing unit 18, and drives the optical pickup 20 in the focus direction as well as tracking direction so that the optical beam 40 is correctly irradiated to a desired track on the optical disc 100.

Furthermore, the PBS 24 (FIG. 5) splits off part of the optical beam 40 by reflecting the beam using the polarization plane under a predetermined light amount ratio, and makes thus obtained beam go to an APC photodetector 23 through an Auto Power Control (APC) lens 22. The APC photodetector 23 detects the light amount of the incoming optical beam 40, and generates an APC detection current with a current value according to the light amount to supply the current to the control unit 12.

By increasing and decreasing a drive current to be supplied to the laser diode 1 and adjusting the output of the laser diode 1 so that the APC detection current has a predetermined current value, the control unit 12 controls the intensity of the optical beam 40 irradiated from the laser diode 1 such that the intensity comes to be a predetermined value according to the kind of the optical disc 100, reproduction processing, and record processing.

In this way, the optical disc device 10 performs the reproduction processing as well as record processing with respect to the optical disc 100.

(1-2) Outline of Present Embodiment

Figure 6A:
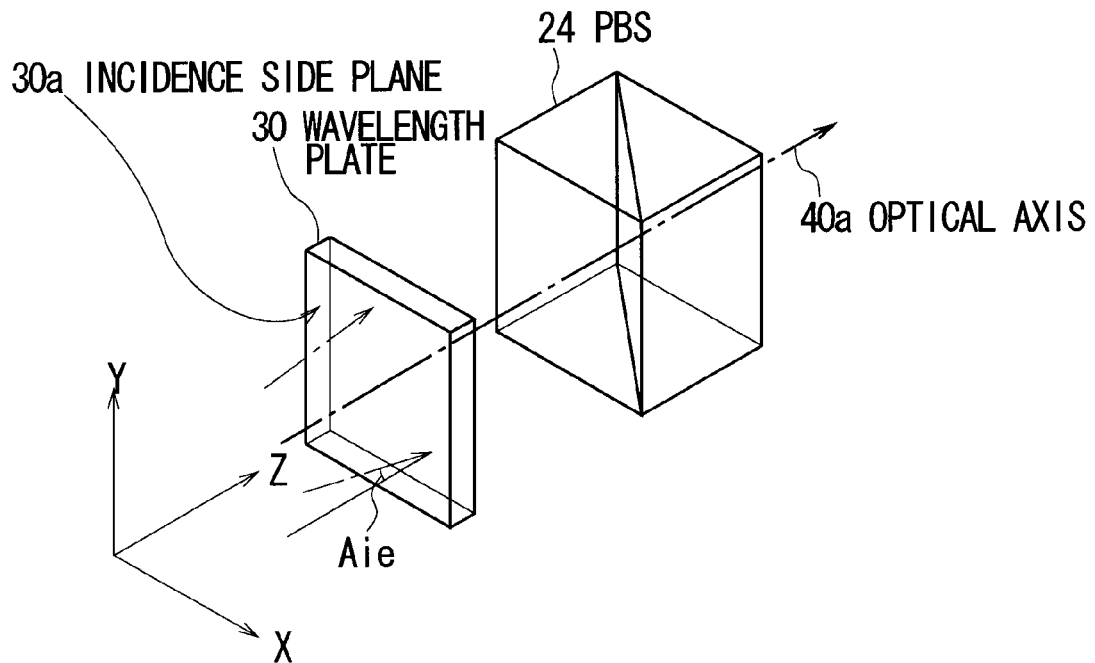
FIG. 6A and FIG. 6B show schematic views to explain the definition of the azimuth and angle.

As shown in FIG. 6A, in the optical pickup 20 of this embodiment, the PBS 24 is arranged with its polarization plane set parallel with the vertical direction, and the most part of the incoming optical beam 40 being a divergent beam is converted to the P-polarization being the linear polarization by the wavelength plate 30, and the optical beam 40 transmitting the PBS 24 is directed to the objective lens 27 (FIG. 5).

Figure 6B:
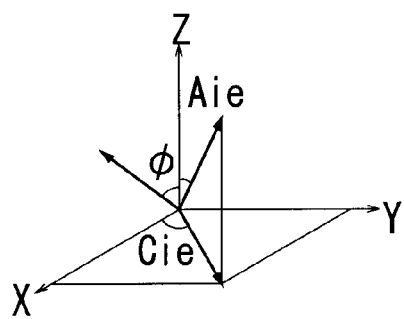

Hereinafter, a plane which includes an incidence side plane 30a of the wavelength plate 30 and is perpendicular to the optical axis 40a of the optical beam 40 is set to the X-Y plane, the horizontal direction is set to the X-axis, the vertical direction is set to the Y-axis, and the direction of a perpendicular line with respect to the incidence side plane 30a of the wavelength plate 30 (that is, optical axis 40a of optical beam 40) is set to the Z-axis, and an explanation will be made. Furthermore, as shown in FIG. 6B, an angle formed by local part of the optical beam 40 and the Z-axis is set to an incidence angle Aie, while an angle formed by a line which is formed when the optical beam 40 is projected to the X-Y plane and the X-axis is set to an incidence azimuth Cie. Hereinafter, so long as any comment is not offered, the angle and azimuth are used under the same definition.

Since the optical beam 40 is irradiated from the laser diode 1 as a divergent beam, the incidence angle Aie with respect to the incidence side plane 30a of the wavelength plate 30 is approximately 0° at the central part of the optical beam 40, while is approximately ±5° at the rim part of the optical beam 40.

In the optical pickup 20 of this embodiment, by utilizing the phenomenon that the incidence angle Aie at the central part of the optical beam 40 (referred to as beam center, hereinafter) is different from that at the rim part of the optical beam 40 (referred to as beam rim, hereinafter), and by purposefully providing the wavelength plate 30 with the incidence angle dependence, with respect to the θ// direction (referred to as beam parallel azimuth Cdθ//, hereinafter) of the optical beam 40, the light amount at the beam center is reduced without reducing the light amount at the beam rim.

Figure 7:
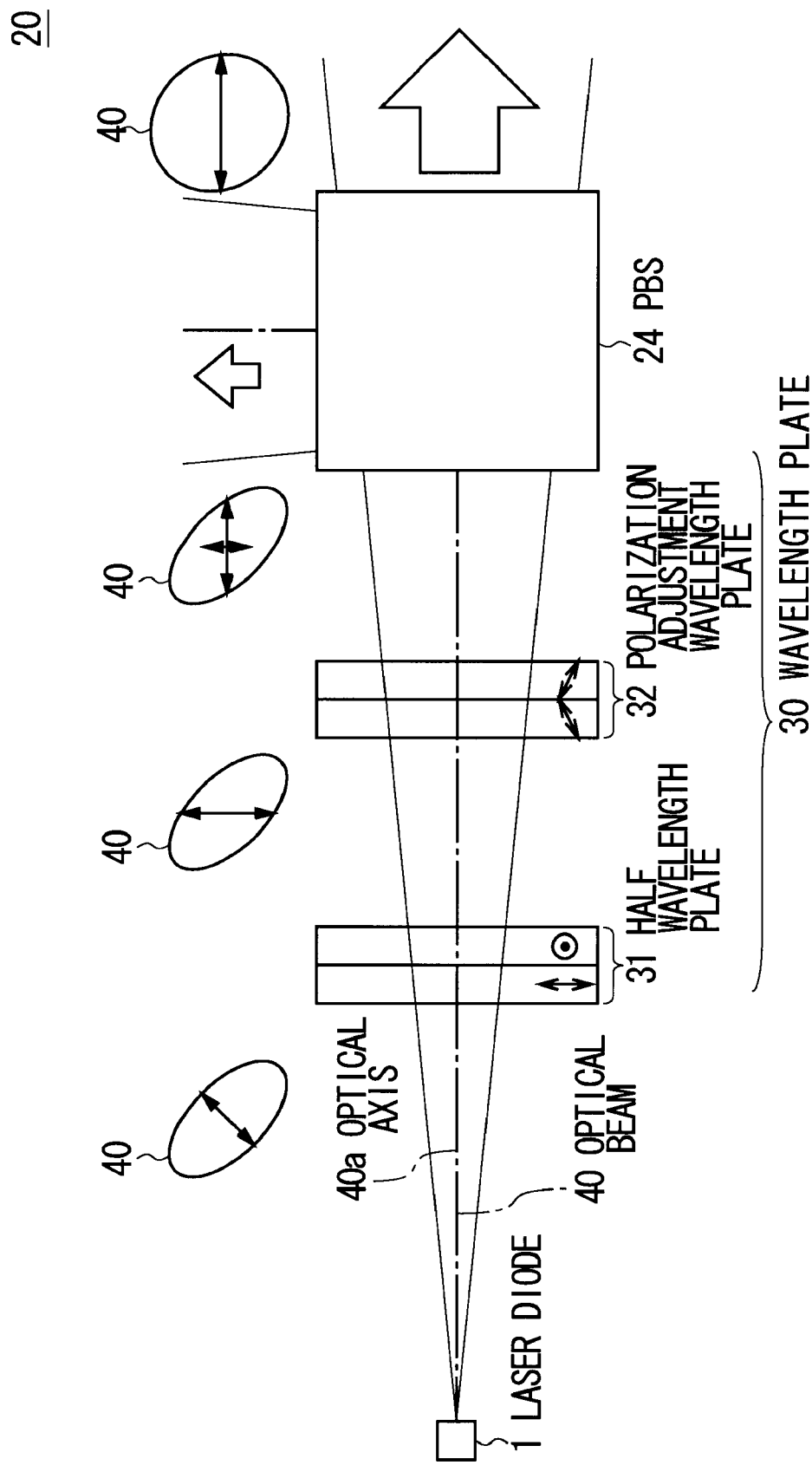
FIG. 7 shows a schematic view to explain the general outline of the first embodiment.

Specifically, as shown in FIG. 7, the wavelength plate 30 is composed of a half wavelength plate 31 and a polarization adjustment wavelength plate 32. The half wavelength plate 31 converts the optical beam 40 of the linear polarization irradiated from the laser diode 1 to the S-polarization, and makes the resulting beam go to the polarization adjustment wavelength plate 32. The P-polarization and S-polarization represent the polarization direction of the optical beam 40 which is defined by the polarization plane of the PBS 24.

The polarization adjustment wavelength plate 32 adjusts the local ratio of the P-polarization and S-polarization for respective parts of the optical beam 40 such that the ratio of the P-polarization comes to be low at the beam center of an incoming beam with the incidence angle Aie of approximately 0° (that is, perpendicular incidence), while the ratio of the P-polarization comes to be high at the beam rim of an incoming beam with the incidence angle Aie of approximately ±5°, that is, as the incidence angle Aie becomes larger, the ratio of the P-polarization becomes higher, and makes the resulting beam go to the PBS 24.

Figure 8A:
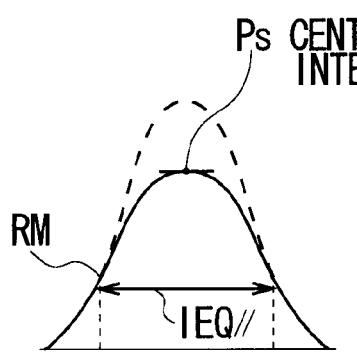
FIG. 8A and FIG. 8B show schematic views to explain the effect of the present invention.
Figure 8B:
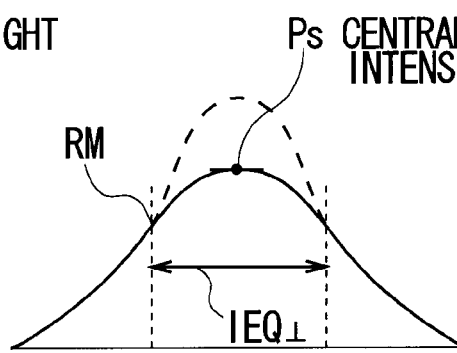

By reflecting the S-polarization and making the P-polarization transmit therethrough, as shown in FIG. 8A and FIG. 8B, the PBS 24 can reduce the central light intensity Ps of the optical beam 40 directed to the objective lens 27, which can improve the rim intensity ratio of the optical beam 40.

Furthermore, at this time, the polarization adjustment wavelength plate 32 adjusts the ratio of the P-polarization and S-polarization of the optical beam 40 such that the ratio of the P-polarization in the beam parallel azimuth Cdθ// comes to be higher than that in the θ⊥ direction (referred to as beam perpendicular azimuth Cdθ⊥, hereinafter) at the beam rim.

(1-3) Configuration of Wavelength Plate

The half wavelength plate 31 and polarization adjustment wavelength plate 32 will be explained by comparing these plates with a general wavelength plate.

(1-3-1) Configuration of General Wavelength Plate

Figures 9A, 9B:
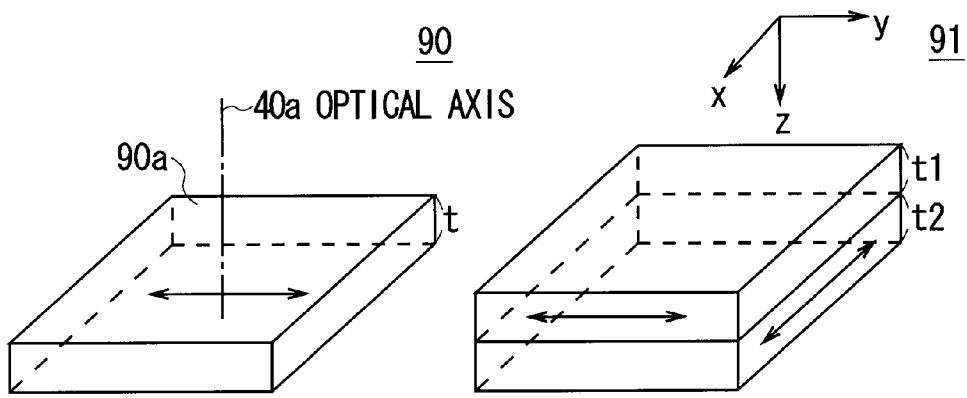
FIG. 9A and FIG. 9B show schematic views indicative of a general wavelength plate.

A general monolayer wavelength plate (referred to as monolayer type wavelength plate, hereinafter) 90 is made of crystal material provided with the birefringence such as quartz, and, as shown in FIG. 9A, is in the form of a plate with its incidence side plane 90a receiving the optical beam 40 set substantially in the form of a square. Hereinafter, in the wavelength plate, a direction along which the birefringence is not brought about is defined as the crystal axis, and this direction is represented by a two-way arrow in the wavelength plate, and further, the angle of the crystal axis with respect to the optical axis 40a is referred to as a crystal axis inclination angle Ø, the direction in which the optical beam 40 travels with a high speed in the wavelength plate is referred to as a high speed axis azimuth, while the direction in which the optical beam 40 travels with a low speed is referred to as the slow axis azimuth.

In the monolayer type wavelength plate 90, the crystal axis is located in the incidence side plane 90a, that is, in the X-Y plane, and is so arranged as to be perpendicular to the optical axis 40a of the optical beam 40, that is, such that the crystal axis inclination angle Ø comes to be 90°. In the monolayer type wavelength plate 90, the crystal axis comes to be the slow axis azimuth, and the high-speed axis azimuth comes to be perpendicular to the crystal axis in the X-Y plane.

In the monolayer type wavelength plate 90, since the refractive index in the high speed axis azimuth is different from that in the slow axis azimuth, by adjusting the thickness thereof, a phase difference Δ can be brought about between the optical beam 40 traveling in the high speed axis azimuth and the optical beam 40 traveling in the slow axis azimuth. When the thickness of the monolayer type wavelength plate 90 along the Z-axis is set to "t", the refractive index in the high speed axis azimuth is set to "$n_O$", the refractive index in the slow axis azimuth is set to "$n_E$", the phase difference Δ can be represented as the following mathematical expression.

$$\Delta = (n_E - n_O)t \quad (1)$$

When the phase difference Δ can be represented by "X" times of the wavelength λ of the optical beam 40 (that is, Δ=Kλ), the monolayer type wavelength plate 90 is referred to as "K wavelength plate", and, for example, is used as "half wavelength plate (180° wavelength plate)" when K=½, while is used as "quarter wavelength plate (90° wavelength plate)" when K=¼. That is, the phase difference Δ of the half wavelength plate 90 as the monolayer type wavelength plate 90 is represented as the following mathematical expression.

$$\Delta = \tfrac{1}{2} \times \lambda \quad (2)$$

On the other hand, a half wavelength plate 90z that fulfills the mathematical expression (2) (referred to as zero-order half wavelength plate, hereinafter), which has to have its thickness "t" set to approximately several dozen μm, has difficulty in working and is rarely used actually.

As the following mathematical expression, by adding the phase difference Δ which is positive integer "m" times of the wavelength λ, it is considered that the half wavelength plate 90 that can bring about the phase difference Δ similar to that obtained by the mathematical expression (2) can be formed.

$$\Delta = (\tfrac{1}{2} + m) \times \lambda \quad (3)$$

By increasing the value of the integer "m" in the mathematical expression (3), since the thickness "t" of the half wavelength plate 90 can be increased, it becomes possible to form the half wavelength plate 90 that can be easily worked, which is used as an m-order wavelength plate.

The half wavelength plate 90 is provided with the incidence angle dependence. That is, in case the optical beam 40 being a divergent beam comes in, while the beam center is made to go to the half wavelength plate 90 perpendicularly with the incidence angle Aie=0°, the beam rim is made to go to the half wavelength plate 90 with approximately the incidence angle Aie=±5°. Accordingly, since the optical path length in the half wavelength plate 90 at the beam rim becomes longer as compared with that at the beam center, the phase difference Δ at the beam rim becomes larger than the phase difference Δ at the beam center.

The half wavelength plate 90 is provided with the wavelength dependence. That is, it is known that an error is raised in the wavelength λ of the optical beam 40 irradiated from the laser diode 1 depending on the condition such as the temperature change, and since an error is raised in the phase itself of the optical beam 40 due to the error in the wavelength λ, an error comes to be raised in the phase difference Δ to be brought about in the optical beam 40 by the half wavelength plate 90.

Since the zero-order half wavelength plate 90 is ½×λ in entire optical path length, which is short, the incidence angle dependence and wavelength dependence thereof are small. Accordingly, the zero-order half wavelength plate 90 can be provided with excellent characteristics that the phase difference Δ is not changed widely depending on the incidence angle Aie or wavelength λ of the optical beam 40.

On the other hand, in the m-order half wavelength plate 90, since the entire optical path length thereof becomes long, and an error raised as the ½×λ in the mathematical expression (2) is repeated by (2m+1) times, the incidence angle dependence and wavelength dependence with respect to the optical beam 40 undesirably become large. Accordingly, the m-order half wavelength plate 90 uses a light source which is desirable in monochromaticity, and is used only for a parallel beam which has its incidence angle Aie determined with high accuracy, and is used only in comparatively limited fields.

As shown in FIG. 9B, there may be used a combined wavelength plate 91 that is configured by putting together two monolayer type wavelength plates 90z such that the respective crystal axes are set perpendicular to each other. In the combined wavelength plate 91, when thicknesses of the two monolayer type wavelength plates 90 are set to t1, t2, respectively, the phase difference Δ can be represented as follows.

$$\Delta = (n_E - n_O)(t1 - t2) \quad (4)$$

That is, in the combined wavelength plate 91, since the respective crystal axes are perpendicular to each other, the phase difference Δ corresponding to the identical thickness can be offset between the two monolayer type wavelength plates 90, which can bring about the phase difference Δ according to the difference δt between the thicknesses t1 and t2 (referred to as thickness difference, hereinafter).

In this case, even if the optical path length of the optical beam 40 in the combined wavelength plate 91 becomes long, since errors of the phase differences Δ raised in the two monolayer type wavelength plates 90 can be offset mutually, the error of the phase difference Δ due to the incidence angle dependence and wavelength dependence comes to be raised according to the thickness difference δt, and can be set to a value substantially equal with that in the case of above-described zero-order half wavelength plate 90.

In this way, the combined wavelength plate 91, which is provided with little incidence angle dependence and wavelength dependence and can be easily worked, is widely used generally.

(1-3-2) Behavior of Crystal Axis Angle and Wavelength Plate

As the general characteristics of crystal material provided with the birefringence which is used for the wavelength plate, it is known that, when the crystal axis inclination angle Ø is made small, the incidence angle dependence in the phase difference Δ brought about by the wavelength plate is largely expressed. Above-described general monolayer type wavelength plate 90 and combined wavelength plate 91 are used with the crystal axis inclination angle Ø set to maximum 90° purposefully so as to make the incidence angle dependence small.

Figures 10A, 10B:
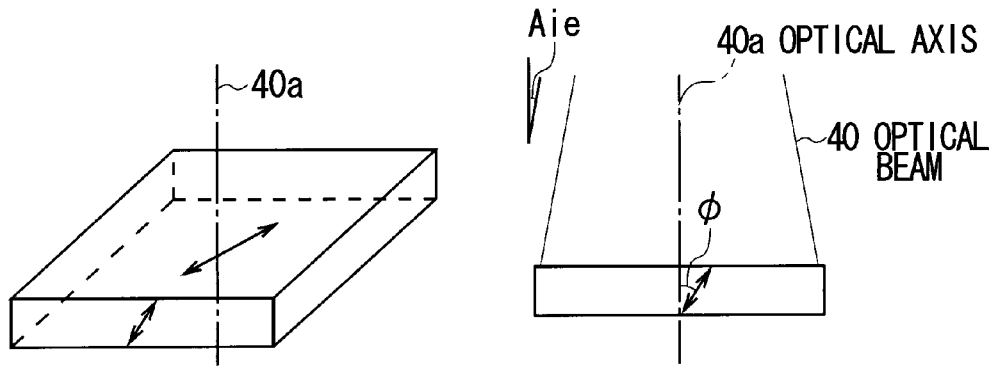
FIG. 10A and FIG. 10B show schematic views indicative of a wavelength plate in the embodiment.

Accordingly, in the polarization adjustment wavelength plate 32 in this embodiment, as shown in FIG. 10A and FIG. 10B, by making the crystal axis inclination angle Ø small, and largely expressing the incidence angle dependence of the polarization adjustment wavelength plate 32 as compared with that of the monolayer type wavelength plate 90 and combined wavelength plate 91, the phase difference Δ brought about at the beam center and beam rim is changed according to the incidence angle Aie of the optical beam 40 with respect to the polarization adjustment wavelength plate 32.

(1-3-3) Configuration of Polarization Adjustment Wavelength Plate

Figure 11A:
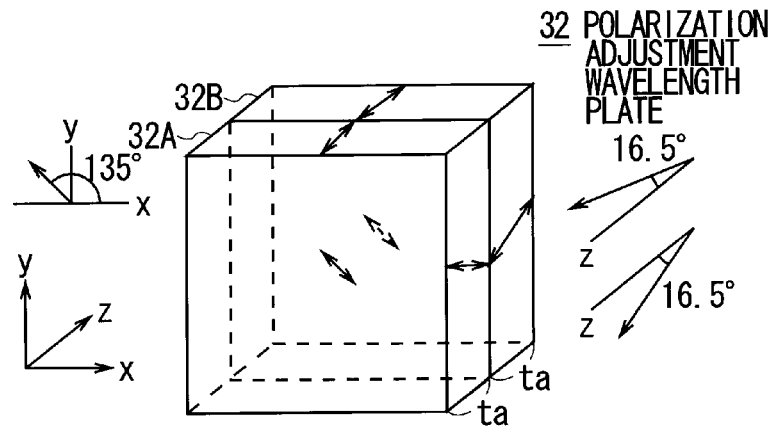
FIG. 11A to FIG. 11C show schematic views indicative of the configurations of a polarization adjustment wavelength plate.
Figure 11B:
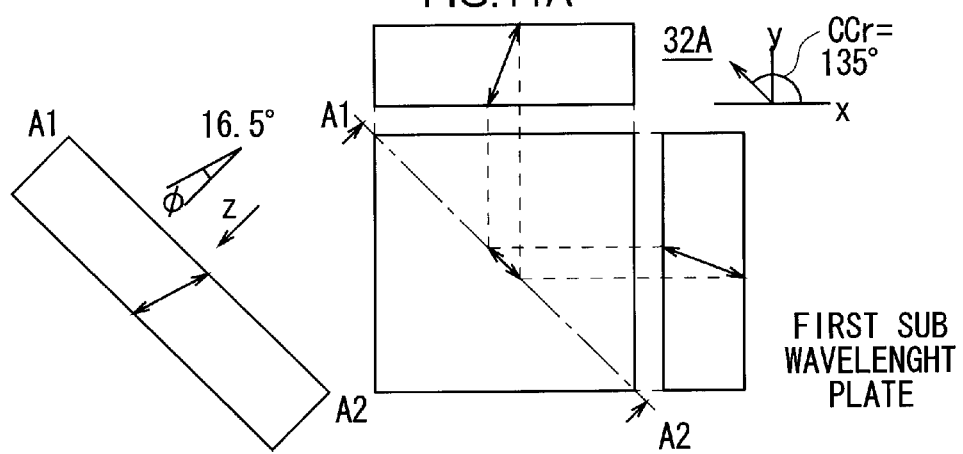
Figure 11C:
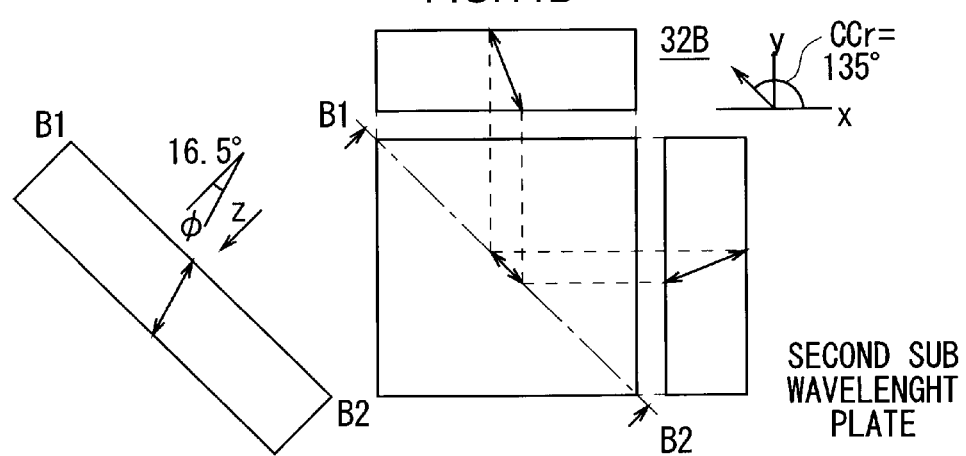
Figure 12:
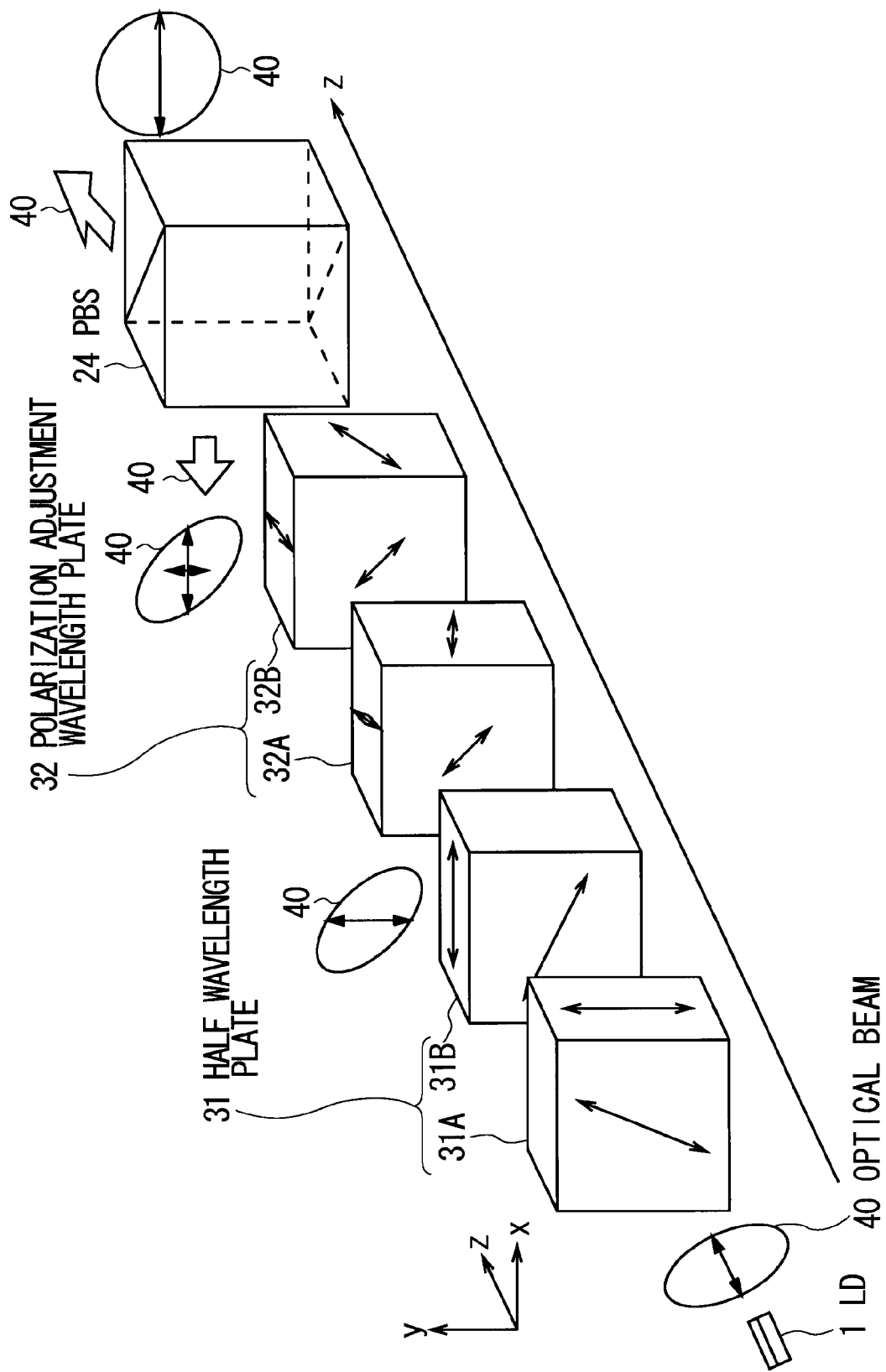
FIG. 12 shows a schematic view to explain the arrangement of wavelength plates and a PBS.

As shown in FIG. 11A to FIG. 11C, the polarization adjustment wavelength plate 32 is configured by putting together a first sub wavelength plate 32A and a second sub wavelength plate 32B which are made of crystal material provided with the birefringence (for example, quartz). The polarization adjustment wavelength plate 32 assumes the role similar to that of a general half wavelength plate, and, as shown in FIG. 12, is arranged at the anterior stage of the PBS 24, and converts the most part of the incoming optical beam 40 of the S-polarization to the P-polarization, and makes the resulting beam go to the PBS 24. Accordingly, a crystal axis azimuth Ccr (FIG. 11A to FIG. 11C) is set to 135°.

In FIG. 12, in order to make the directions of the crystal axis azimuth Ccr and crystal axis inclination angle Ø comprehensible, for the sake of convenience, the polarization adjustment wavelength plate 32 and half wavelength plate 31 are represented as two wavelength plates respectively.

In the polarization adjustment wavelength plate 32 (FIG. 11A to FIG. 11C), utilizing the relationship between the crystal axis inclination angle Ø and thickness "ta" of the first sub wavelength plate 32A and second sub wavelength plate 32B, a predetermined phase difference Δ is brought about at the central part of the optical beam 40, and the phase difference Δ is provided with the incidence angle dependence. The thickness "ta" of the respective sub wavelength plates 32Z (first sub wavelength plate 32A and second sub wavelength plate 32B) is set to 0.35 mm, the phase difference Δ with respect to the beam center is set to 240°, and the crystal axis inclination angle Ø is set to ±16.5° (16.5° and 163.5°, respectively).

As shown in FIG. 11A to FIG. 11C, the crystal axis azimuth Ccr is an angle which is formed when the crystal axis is projected to the X-Y plane, and the crystal axis inclination angle Ø represents an angle formed by the crystal axis and the Z-axis (optical axis 40a) in an A1-A2 cross-section and a B1-B2 cross-section which are cut off in parallel with the crystal axis azimuth Ccr, respectively.

In the first sub wavelength plate 32A, since the crystal axis inclination angle Ø is ±16.5° and is small, the incidence angle dependence of the phase difference Δ to be brought about in the optical beam 40 is largely expressed. From FIG. 13, it can be seen that the incidence angle dependence of the phase difference Δ becomes asymmetric in the "+" direction and in the "−" direction of the incidence angle Aie, and is changed depending on the relationship between the azimuth in the optical beam 40 and crystal axis azimuth Ccr.

Figure 13:
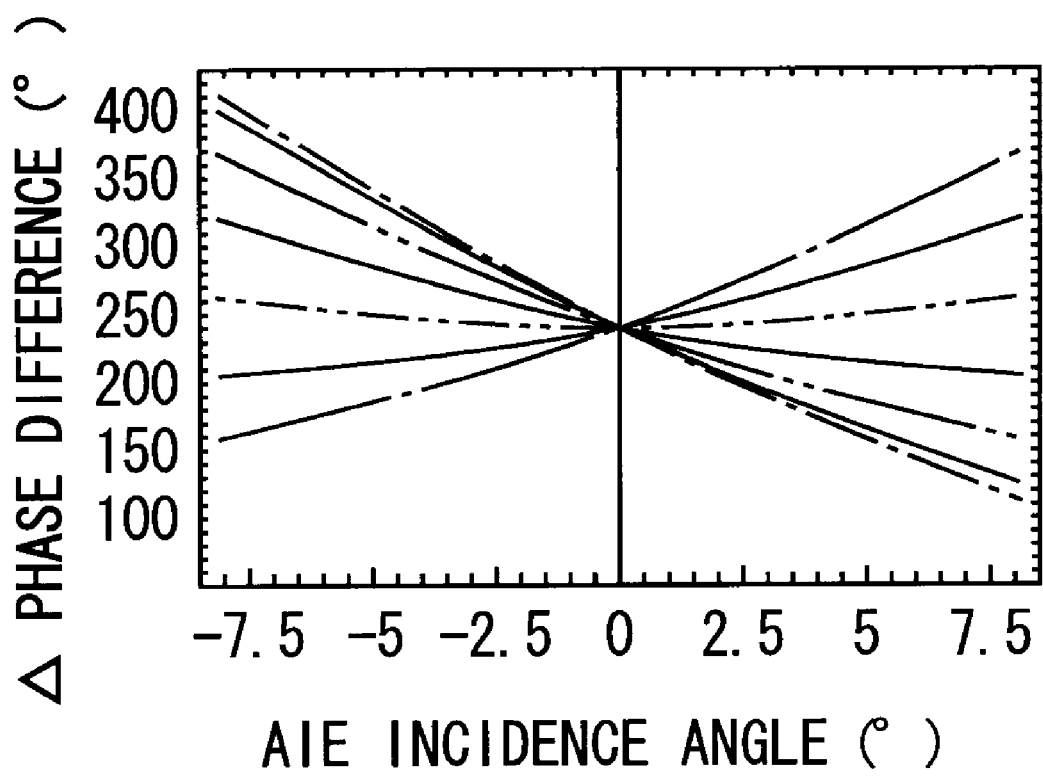
FIG. 13 shows a graph indicative of the incidence angle dependence (1) with respect to the phase difference of a first sub wavelength plate.

Hereinafter, the azimuth of the optical beam 40, which is made to go to the polarization adjustment wavelength plate 32 (FIG. 12) that has its crystal axis azimuth Ccr set to 135°, with respect to the X-axis is set to a beam azimuth Cd, and, in FIG. 13, the relationship between the incidence angle Aie and phase difference Δ of the optical beam 40 with respect to the first sub wavelength plate 32A when the beam azimuth Cd is changed every 22.5° is shown, and graphs at the time of 0°, 45°, 90°, and 135° are shown in FIG. 14A to FIG. 14D.

In the first sub wavelength plate 32A, depending on the incidence angle Aie of the optical beam 40, the angle of the optical beam 40 with respect to the crystal axis azimuth Ccr (referred to as beam/crystal-axis crossing angle, hereinafter) is changed. The smaller the beam/crystal-axis crossing angle is, the larger the refractive index difference δn with respect to the changed amount of the beam/crystal-axis crossing angle. Accordingly, the phase difference Δ becomes asymmetric according the beam azimuth Cd.

When the beam azimuth Cd is 45°, since the change of the beam/crystal-axis crossing angle is symmetric according to the incidence angle Aie, also the phase difference characteristics become symmetric, while When the beam azimuth Cd is 135°, since the change of the beam/crystal-axis crossing angle becomes maximum according to the incidence angle Aie, the asymmetry comes to be maximum.

The second sub wavelength plate 32B, in which the crystal axis inclination angle Ø is symmetric with respect to that in the first sub wavelength plate 32A, is provided with the incidence angle dependence which is symmetric with respect to that of the first sub wavelength plate 32A according to the incidence angle Aie, that is, the incidence angle dependence in which the "+" direction and the "−" direction of the incidence angle Aie are inverted, which is not shown.

Accordingly, by combining the first sub wavelength plate 32A and second sub wavelength plate 32B, as shown in FIG. 15A, the polarization adjustment wavelength plate 32 comes to be provided with the incidence angle dependence which is substantially symmetric with respect to the phase difference Δ with the incidence angle Aie=0° being the center. In FIG. 15A, similar to FIG. 13, the phase difference Δ with respect to the incidence angle Aie as the whole two sub wavelength plates 32Z (that is, polarization adjustment wavelength plate 32) when plotting the beam azimuth Cd every 22.5° is represented, and all the curves are substantially overlapped.

Accordingly, by combining the first sub wavelength plate 32A and second sub wavelength plate 32B, the incidence angle dependence arising from the change of above-described beam/crystal-axis crossing angle is substantially canceled, and it can be seen that the polarization adjustment wavelength plate 32 is provided with the substantially identical incidence angle dependence with respect to any beam azimuth Cd.

Furthermore, in the polarization adjustment wavelength plate 32, the ratio of the P-polarization and S-polarization can be changed according to the brought about phase difference Δ, and, when the phase difference Δ is 180°, substantially one hundred percent of the S-polarization can be converted to the P-polarization.

In the two sub wavelength plates 32Z of the polarization adjustment wavelength plate 32, the thickness "ta" is set up such that, at the beam center, a phase difference Δ (Δ=1× 360°+120°) which is lower than a phase difference Δ (m×360°+180°), which is brought about with respect to the optical beam 40 by the general m-order half wavelength plate to change the polarization direction of the optical beam 40, by 60° is brought about.

Accordingly, in the polarization adjustment wavelength plate 32, at the beam rim (around ±5°) where the phase difference Δ becomes larger as compared with that at the beam center due to the incidence angle dependence, a phase difference Δ of approximately 500° (360°+140°), which is close to a phase difference Δ of 180° brought about by the general m-order half wavelength plate, can be brought about.

That is, in the polarization adjustment wavelength plate 32, since the phase difference Δ at the beam rim comes close to 180° as compared with that at the beam center, the ratio of conversion to the P-polarization at the beam rim becomes higher as compared with that at the beam center. In this case, of the incoming optical beam 40 of the S-polarization, the polarization adjustment wavelength plate 32 converts 80% to the P-polarization and the remaining 20% to the S-polarization at the beam center, while can convert 90% to the P-polarization and the remaining 10% to the S-polarization at the beam rim.

As a result, as shown in FIG. 15B, by making the P-polarization transmit and reflecting the S-polarization using the PBS 24 arranged at the posterior stage, the polarization adjustment wavelength plate 32 can set the transmission factor with respect to the PBS 24 (referred to as PBS transmission factor, hereinafter) at the beam center to 80%, while set the PBS transmission factor at the beam rim to 90%.

The respective sub wavelength plates 32Z, in which the crystal axis inclination angle Ø is small and the refractive index difference δn is small, can assure a thickness (0.35 mm) which can be easily worked when produced as a zero-order wavelength plate.

(1-3-4) Beam Azimuth and Slow Axis Azimuth

In FIG. 15A, it is explained that the incidence angle dependence of the polarization adjustment wavelength plate 32 is not substantially changed depending on the beam azimuth Cd. On the other hand, as the general property of crystal provided with the birefringence, in case of turning up the crystal axis from the X-Y plane to make the crystal axis inclination angle Ø small, the slow axis azimuth comes to be provided with the incidence angle dependence according to the beam azimuth Cd, and consequently the PBS transmission factor is changed from that shown in FIG. 15B according to the beam azimuth Cd.

Figure 16:
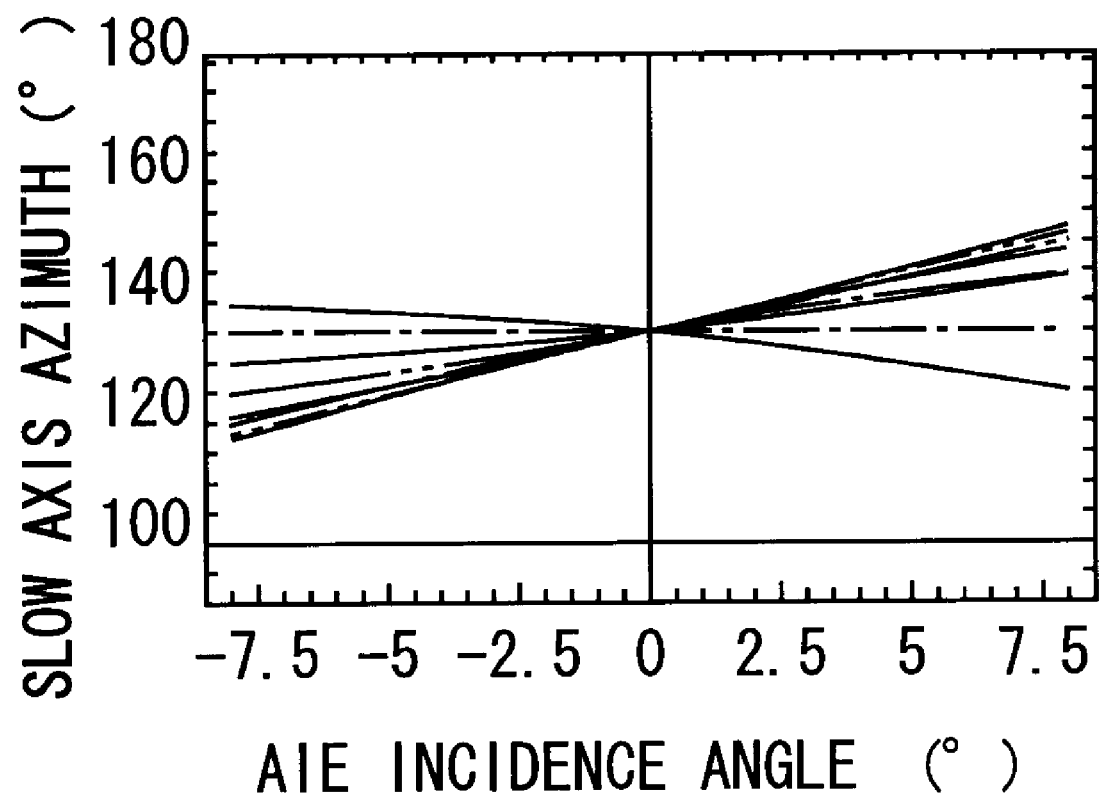
FIG. 16 shows a graph indicative of the relationship (1) between the incidence angle dependence of the slow axis azimuth of the first sub wavelength plate and the beam azimuth.
Figure 17A:
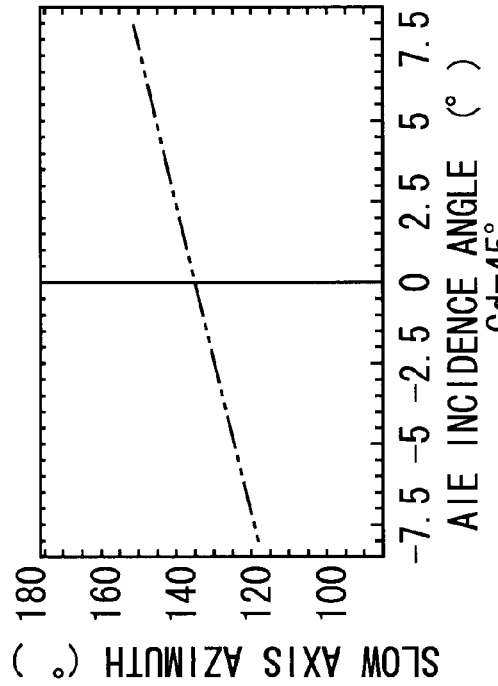
FIG. 17A to FIG. 17D show graphs indicative of the relationship (2) between the incidence angle dependence of the slow axis azimuth of the first sub wavelength plate and the beam azimuth.
Figure 17B:
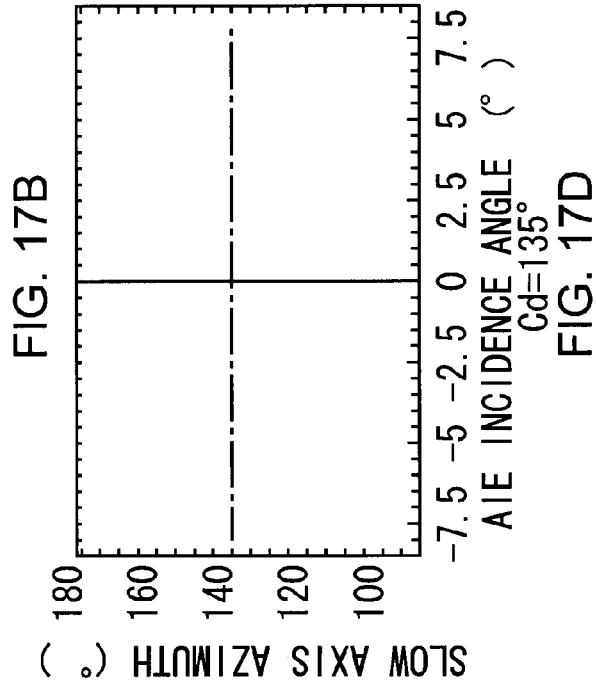
Figure 17C:
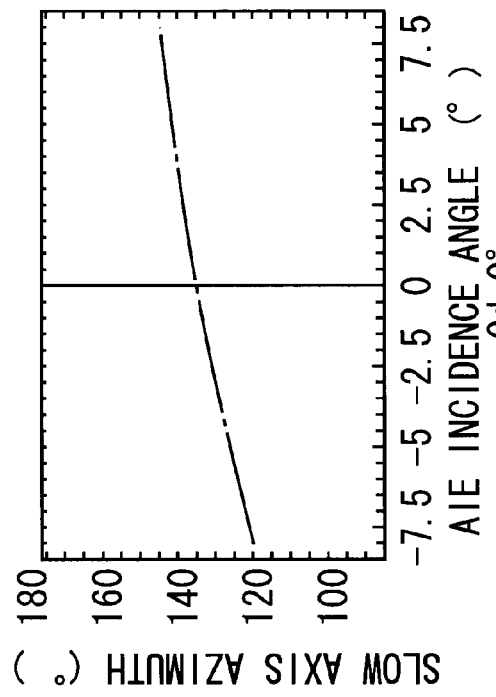
Figure 17D:
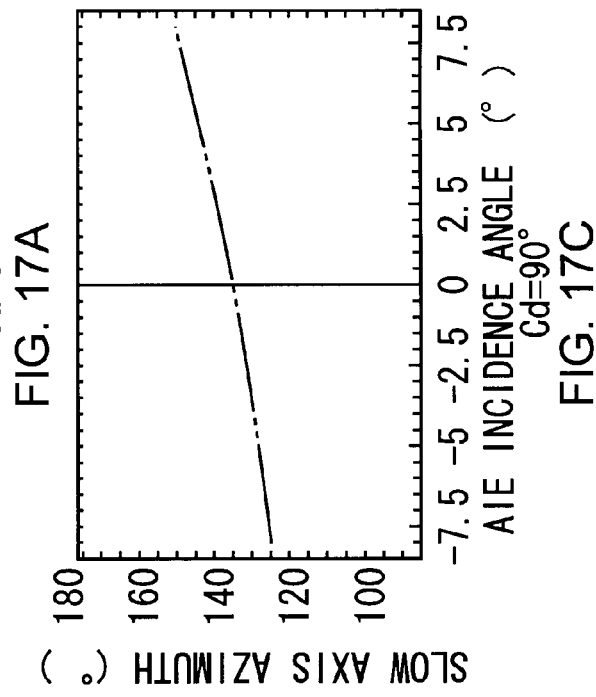

That is, as shown in FIG. 16, in the first sub wavelength plate 32A, the incidence angle dependence of the slow axis azimuth is changed according to the beam azimuth Cd. In FIG. 16, the incidence angle dependence of the slow axis azimuth when the beam azimuth Cd is changed every 22.5° is represented, and graphs when the beam azimuth Cd is 0°, 45°, 90°, and 135° are shown in FIG. 17A to FIG. 17D.

As shown in FIG. 17A to FIG. 17D, the first sub wavelength plate 32A is substantially not provided with the incidence angle dependence of the slow axis azimuth at the time of 135° at which the beam azimuth Cd is identical to the crystal axis azimuth Ccr, while is provided with the maximum incidence angle dependence of the slow axis azimuth at the time of 45° at which the beam azimuth Cd is perpendicular to the crystal axis azimuth Ccr.

Furthermore, the second sub wavelength plate 32B, in which the crystal axis azimuth Ccr is identical to that of the first sub wavelength plate 32A, is provided with the incidence angle dependence of the slow axis azimuth similar to that of the first sub wavelength plate 32A, and as a result, when the first sub wavelength plate 32A and the second sub wavelength plate 32B are combined, the incidence angle dependence of the slow axis azimuth with respect to the beam azimuth Cd comes to be increased respectively, which is not shown.

Accordingly, when adding the factor of the incidence angle dependence of the slow axis azimuth (FIG. 17A to FIG. 17D) to the incidence angle dependence (FIG. 15A) with respect to the phase difference Δ which does not depend on the beam azimuth Cd, the phase difference Δ comes to be changed according to the beam azimuth Cd, and the phase difference Δ at the beam rim is changed according to the beam azimuth Cd and incidence angle Aie in the optical beam 40, which changes the ratio of the P-polarization and the S-polarization.

Figure 18:
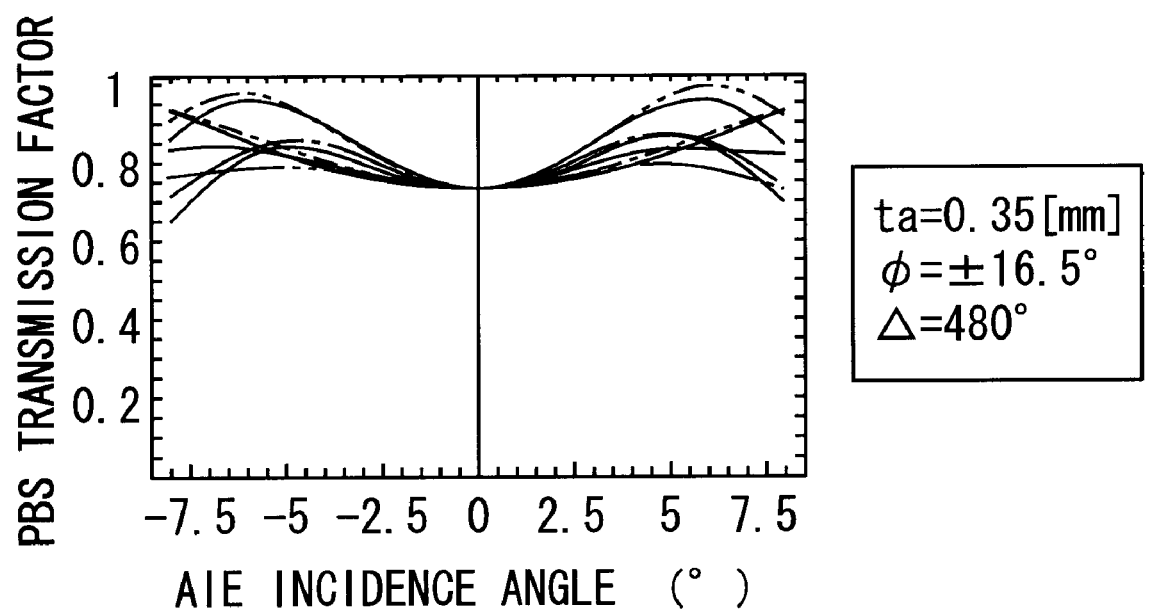
FIG. 18 shows a graph indicative of the relationship (1) between the incidence angle dependence of the PBS transmission factor and the beam azimuth.
Figure 19:
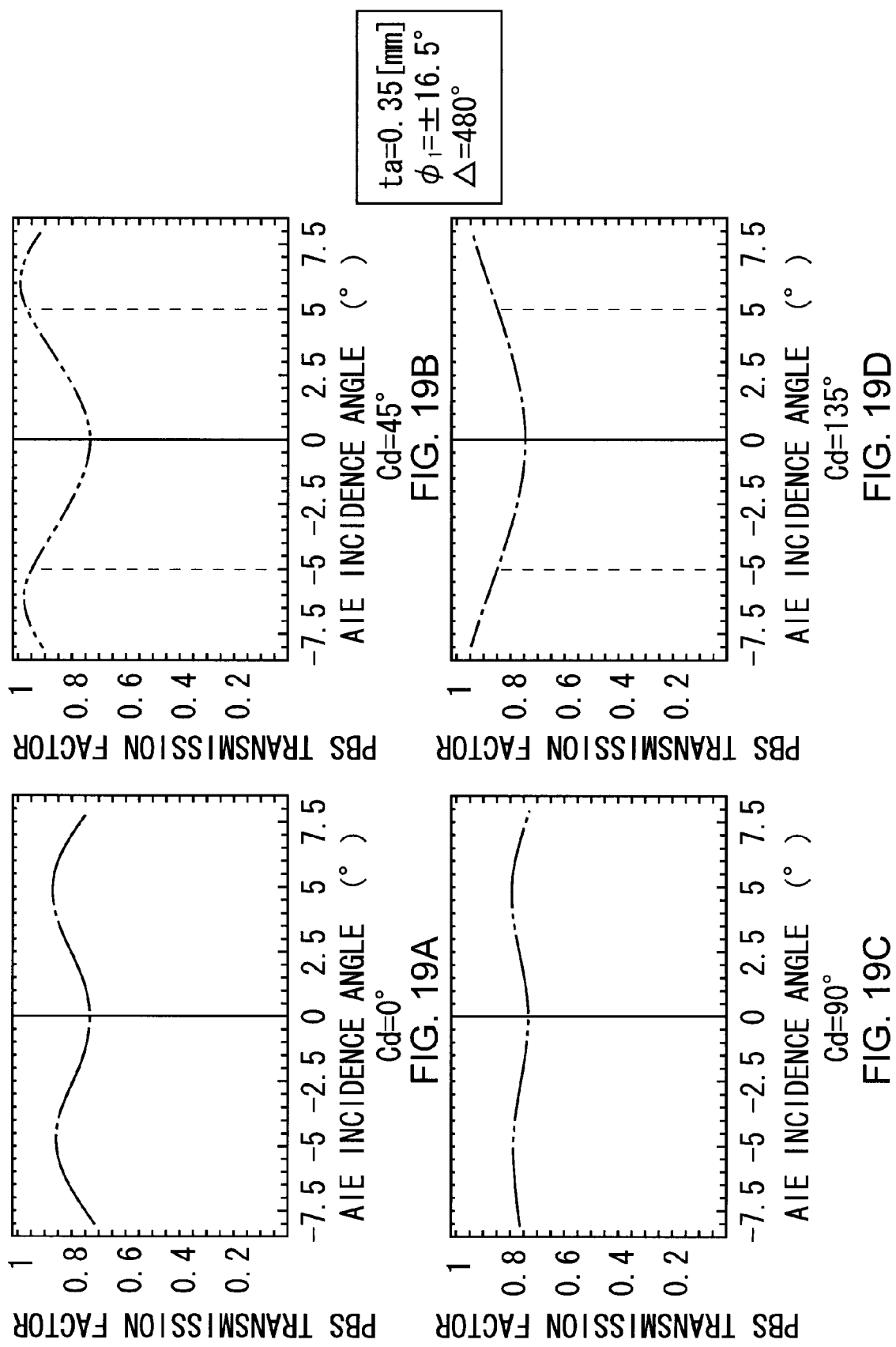
FIG. 19A to FIG. 19D show graphs indicative of the relationship (2) between the incidence angle dependence of the PBS transmission factor and the beam azimuth.

As a result, as shown in FIG. 18, the incidence angle dependence of the PBS transmission factor is changed according to the beam azimuth Cd. In FIG. 18, the incidence angle dependence of the PBS transmission factor when the beam azimuth Cd is changed every 22.5° is represented, and graphs when the beam azimuth Cd is 0°, 45°, 90°, and 135° are shown in FIG. 19A to FIG. 19D.

When comparing the graphs shown in FIG. 19A to FIG. 19D, the PBS transmission factor at the beam center is substantially 80% regardless of the beam azimuth Cd, while the PBS transmission factor at the beam rim (incidence angle Aie=±5°) is widely changed according to the beam azimuth Cd, and represents the highest value of approximately 98% when the beam azimuth Cd=45° (FIG. 19B).

Accordingly, in the optical pickup 20 of this embodiment, as shown in FIG. 12, by inclining the laser diode 1 by 45°, the beam parallel azimuth Cdθ// is set to 45° from the X-axis.

Accordingly, the optical pickup 20 sets the PBS transmission factor with respect to the beam parallel azimuth Cdθ// to approximately 80% at the beam center, and to substantially 98% at the beam rim, and the light intensity at the beam center (central light intensity Ps) can be reduced substantially without reducing the light intensity at the beam rim, which can improve the rim intensity ratio effectively.

Furthermore, the beam perpendicular azimuth Cdeθ⊥ perpendicular to the beam parallel azimuth Cdθ// becomes 135° from the X-axis. In the PBS transmission factor when the beam azimuth Cd is 135° (FIG. 19D), the incidence angle dependence is comparatively moderate, and is approximately 85% when the incidence angle Aie=±5°.

Accordingly, the optical pickup 20 sets the PBS transmission factor with respect to the beam perpendicular azimuth Cdθ⊥ to approximately 80% at the beam center, and to 85% at the beam rim, and the rim intensity ratio can be improved, and further the PBS transmission factor with respect to the beam parallel azimuth Cdθ// can be made higher than the PBS transmission factor with respect to the beam perpendicular azimuth Cdθ⊥ at the beam rim, which can set the figuration of the contour line of the light intensity distribution of the optical beam 40 (referred to as figuration of optical beam 40, hereinafter) transmitting the PBS 24 close to a perfect circle.

In this case, in the optical pickup 20, the polarization direction of the optical beam 40 irradiated from the laser diode 1 comes to be inclined by 45°, in which case it is necessary to make the optical beam 40 of the S-polarization go to the polarization adjustment wavelength plate 32.

Accordingly, in the optical pickup 20, the half wavelength plate 31 is arranged at the anterior stage of the polarization adjustment wavelength plate 32 (FIG. 7).

Figure 20:
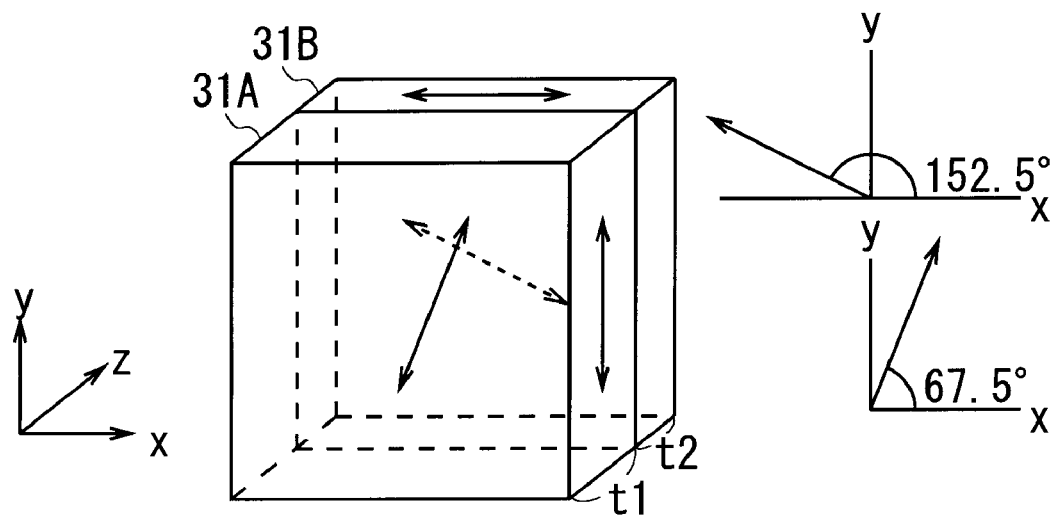
FIG. 20 shows a schematic view indicative of the configuration of a half wavelength plate.

As shown in FIG. 20, the configuration of the half wavelength plate 31 is substantially similar to that of above-described general combined wavelength plate 91, and crystal axis azimuth Cch of monolayer type wavelength plates 31A and 31B configuring the half wavelength plate 31 is set to 67.5° and 152.5° respectively. In order to bring about a phase difference Δ of 180°, thickness "t1" of the monolayer type wavelength plate 31A is made larger than thickness "t2" of the monolayer type wavelength plate 31B.

Accordingly, the optical pickup 20 can incline the polarization direction of the optical beam 40 by 45° using the half wavelength plate 31, and can make the optical beam 40 of the S-polarization go to the polarization adjustment wavelength plate 32.

As a result, as shown in FIG. 7, the optical pickup 20 converts the optical beam 40, which is irradiated from the laser diode 1 under the beam parallel azimuth Cdθ//=45° and is elliptical in figuration, to the S-polarization using the half wavelength plate 31, and makes the resulting beam go to the polarization adjustment wavelength plate 32.

By adjusting the ratio of the P-polarization and S-polarization in the optical beam 40 according to the incidence angle Aie and beam azimuth Cd of the optical beam 40 using the incidence angle dependence of the phase difference Δ of the sub wavelength plates 32A, 32B and the incidence angle dependence of the slow axis azimuth with respect to the beam azimuth Cd, the polarization adjustment wavelength plate 32 makes the rim intensity ratio with respect to the P-polarization of the beam parallel azimuth Cdθ// larger than the rim intensity ratio of the incoming optical beam 40, and reduces the light intensity difference between the beam parallel azimuth Cdθ// and beam perpendicular azimuth Cdθ⊥ with respect to the P-polarization at the beam rim, and then makes the resulting beam go to the PBS 24.

Then, of the optical beam 40, by making the P-polarization transmit, the PBS 24 can direct the optical beam 40 whose figuration is substantially a perfect circle to the objective lens 27, and reflects the S-polarization to direct thus reflected S-polarization to the APC photodetector 23.

Accordingly, the optical pickup 20 can utilize the optical beam 40 of the S-polarization reflected by the PBS 24 as detection light for APC, and does not have to extract detection light for APC from the optical beam 40, which can improve the light utilization efficiency of the optical beam 40.

In the half wavelength plate 31 (FIG. 20), the crystal axis azimuth Cch of the monolayer type wavelength plate 31A which brings about the phase difference Δ of 180° (that is, slow axis in the half wavelength plate 31) is set to 67.5°, which is within ±45° from the vertical line of the crystal axis azimuth Ccr of the polarization adjustment wavelength plate 32, and the phase difference Δ brought about at the beam center is set not to ½×λ but to ³⁄₂×λ.

Figure 21:
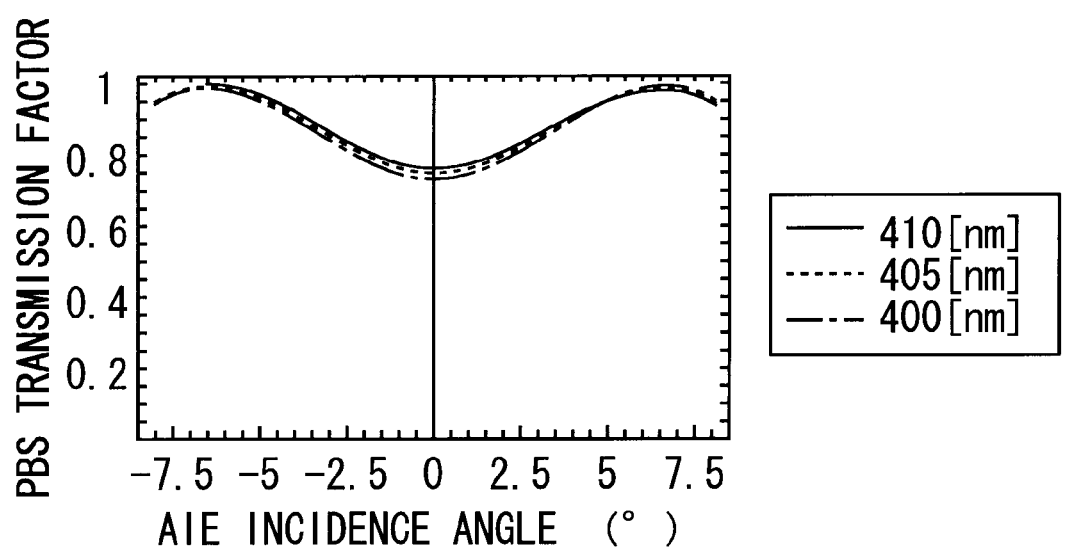
FIG. 21 shows a graph indicative of the wavelength dependence of the PBS transmission factor.

Accordingly, in the optical pickup 20, the half wavelength plate 31 is purposefully provided with the wavelength dependence whose direction is opposite to that of the wavelength dependence of the polarization adjustment wavelength plate 32, which can offset the wavelength dependence of the polarization adjustment wavelength plate 32 using the half wavelength plate 31. As a result, as shown in FIG. 21, in which the PBS transmission factor when the optical beam 40 of 405 and 405±5 nm is irradiated from the laser diode 1 is represented, the wavelength dependence as the whole wavelength plate 30 can be reduced.

(1-4) Operation and Effect

In above-described configuration, in the optical pickup 20 of the optical disc device 10, the crystal axis is turned up to be arranged from the X-Y plane as an orthogonal plane with respect to the optical axis 40a by setting the crystal axis inclination angle Ø of the polarization adjustment wavelength plate 32 as a polarization adjustment plate less than 60°, and the wavelength dependence which the crystal material is originally provided with is largely expressed, and the thickness "ta" with respect to the optical axis 40a is set up such that the phase difference Δ brought about at the beam center becomes lower from a desired design value to irradiate the beam as the P-polarization or 360°+180°=540° by a predetermined difference value or 60°.

In the polarization adjustment wavelength plate 32, since the phase difference Δ at the beam rim becomes larger than the phase difference Δ at the beam center due to the incidence angle dependence, the phase difference Δ can be set close to $(m+½)×λ$ by setting the phase difference Δ at the beam center 480° which is lower from 540° by 60°, and the ratio of the P-polarization and S-polarization can be adjusted such that the ratio of the P-polarization at the beam rim becomes higher than that at the beam center.

Furthermore, the polarization adjustment wavelength plate 32 is configured by two plates made of crystal material or the first sub wavelength plate 32A and second sub wavelength plate 32B, and the thickness "ta" of the first sub wavelength plate 32A and second sub wavelength plate 32B is set to the same 0.35 mm, and the crystal axis inclination angle Ø is set to ±16.5° which is symmetric with respect to the optical axis 40a. Accordingly, the incidence angle dependence of the phase difference Δ to be brought about in the optical beam 40 can be made symmetric in the "+" direction of the incidence angle Aie.

Furthermore, in the polarization adjustment wavelength plate 32, since the crystal axis azimuth Ccr in the first sub wavelength plate 32A and second sub wavelength plate 32B is set to the same direction or 135°, the incidence angle dependence of the slow axis azimuth with respect to the beam azimuth Cd can be increased to be doubled, which can make the characteristics of the incidence angle dependence of the PBS transmission factor when the beam azimuth Cd is 45° different from that when the beam azimuth Cd is 135°.

At this time, in the optical pickup 20, the beam parallel azimuth Cdθ// in which the divergence angle is minimum is set to 45° at which the incidence angle dependence of the PBS transmission factor is large and the improvement effect of the rim intensity ratio is large, while the beam perpendicular azimuth Cdθ⊥ in which the divergence angle is maximum is set to 135° at which the incidence angle dependence of the PBS transmission factor is small and the improvement effect of the rim intensity ratio is small.

In this way, in the polarization adjustment wavelength plate 32, the rim intensity ratio with respect to the beam parallel azimuth Cdθ// of the optical beam 40 can be effectively improved, and the light intensity difference between the beam parallel azimuth Cdθ// and the beam perpendicular azimuth Cdθ⊥ at the beam rim is reduced, which can set the figuration of the optical beam 40 to a perfect circle.

In the polarization adjustment wavelength plate 32, which is formed as a first-order 120° wavelength plate (1×360°+120°), the incidence angle dependence of the phase difference Δ to be brought about in the optical beam 40 can be largely expressed as compared with the case of being formed as a zero-order 120° wavelength plate.

Furthermore, in the optical pickup 20, being different from a conventional anamorphic prism which has to be attached under attachment accuracy of 1 μm unit, the polarization adjustment wavelength plate 32 can be attached with the general machine accuracy level, which can simplify the assembling process for the optical pickup 20.

Being different from a conventional wavelength plate having three regions, since two wavelength plates in the form of a plate respectively are put together, the polarization adjustment wavelength plate 32 can be produced under a process similar to that for producing the general combined wavelength plate 91, and can be produced under a simplified process using the conventional equipments.

According to above-described configuration, using the polarization adjustment wavelength plate 32 made of crystal material provided with the birefringence, by changing the phase difference Δ to be brought about in the optical beam 40 at the beam center and at the beam rim depending on the relationship between the crystal axis inclination angle Ø being an angle of the crystal axis of the polarization adjustment wavelength plate 32 with respect to the optical axis 40a of the optical beam 40 and the thickness "ta" in the optical axis 40a direction, the ratio of the P-polarization and the S-polarization which is the second linear polarization perpendicular to the P-polarization is adjusted according to the incidence angle Aie with respect to the optical beam 40 such that the ratio of the P-polarization being the first linear polarization is low at the beam center, while the ratio of the P-polarization is high at the beam rim, and the PBS 24 makes the P-polarization in the optical beam 40 transmit and directs the optical beam 40 to the objective lens 27, while reflects the S-polarization. Accordingly, the region of polarization adjustment wavelength plate 32 do not have to be divided, and the rim intensity ratio in the θ// direction of the optical beam 40 can be improved by only setting the thickness "ta" of the polarization adjustment wavelength plate 32 and the crystal axis inclination angle Ø, which makes it becomes possible to realize a polarization adjustment plate of simplified configuration, and a optical pickup, an optical disc device, and an optical device which use this polarization adjustment plate.

(2) Second Embodiment

Figure 22:
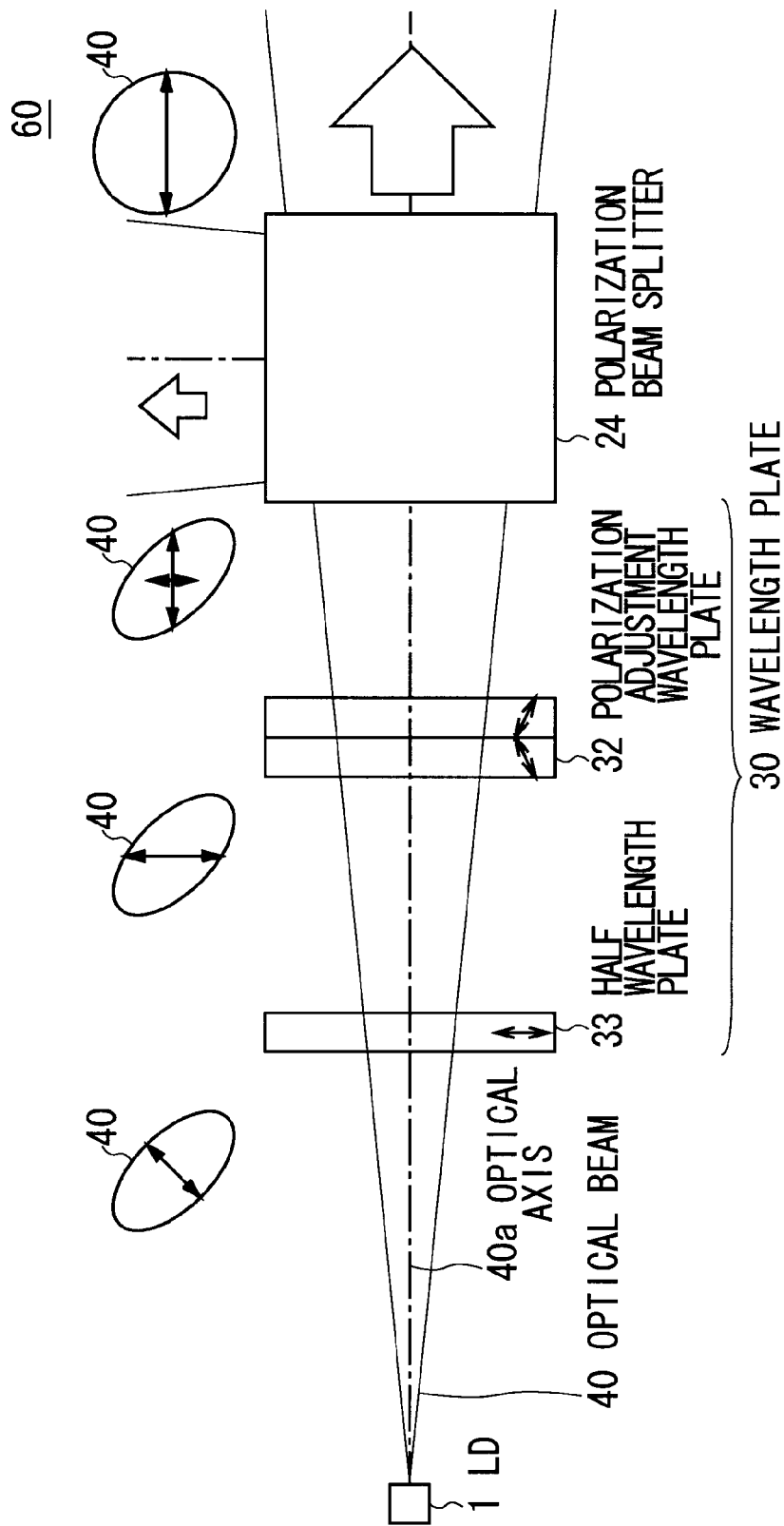
FIG. 22 shows a schematic view indicative of the configuration of an optical pickup of the second embodiment.

FIG. 22 to FIG. 25 show the second embodiment, and parts or components similar to those of the first embodiment shown in FIG. 1 to FIG. 21 are indicated with the same reference numerals. As shown in FIG. 22, an optical pickup 60 in this embodiment includes, as the wavelength plate 30, a half wavelength plate 33 and a polarization adjustment wavelength plate 34. In FIG. 22, only the laser diode 1, wavelength plate 30, and PBS 24 are shown, and other optical parts or components are omitted for the sake of convenience. The configuration as the optical disc device 10 is similar to that shown in FIG. 4, and the explanation of which is omitted.

In the polarization adjustment wavelength plate 34, by making the crystal axis inclination angle Ø of a first sub wavelength plate 34A and a second sub wavelength plate 34B small, the incidence angle dependence of the phase difference Δ to be brought about in the optical beam 40 is largely expressed, and a phase difference Δ=480° is brought about at the central part of the optical beam 40 by setting the thickness "ta", and the thickness "ta" of the respective sub wavelength plates 34Z (first sub wavelength plate 34A and second sub wavelength plate 34B) is set to 0.6 mm, the phase difference Δ with respect to the beam center is set to 240°, and the crystal axis inclination angle Ø is set to ±12.5° (12.5° and 167.5°, respectively).

Figure 23:
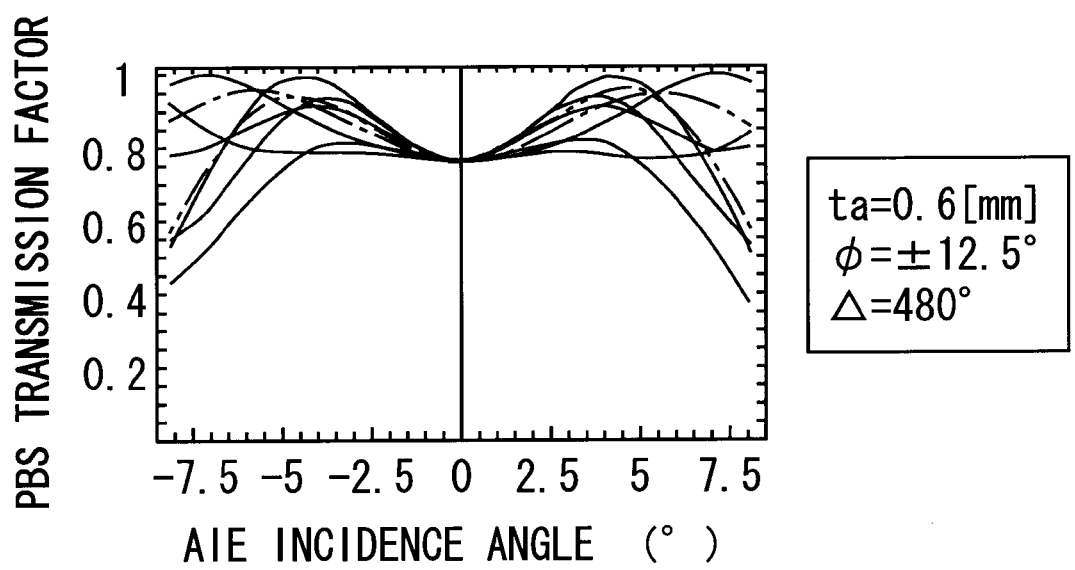
FIG. 23 shows a graph indicative of the relationship (1) between the beam azimuth and the PBS transmission factor of the second embodiment.
Figure 24A:
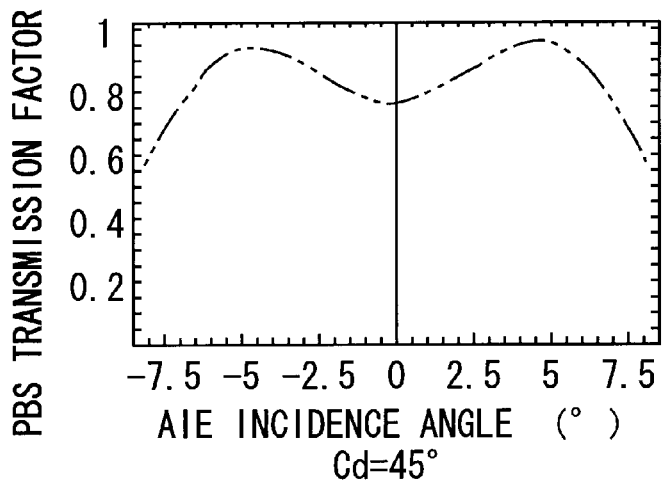
FIG. 24A to FIG. 24C show graphs indicative of the relationship (2) between the beam azimuth and the PBS transmission factor of the second embodiment.
Figure 24B:
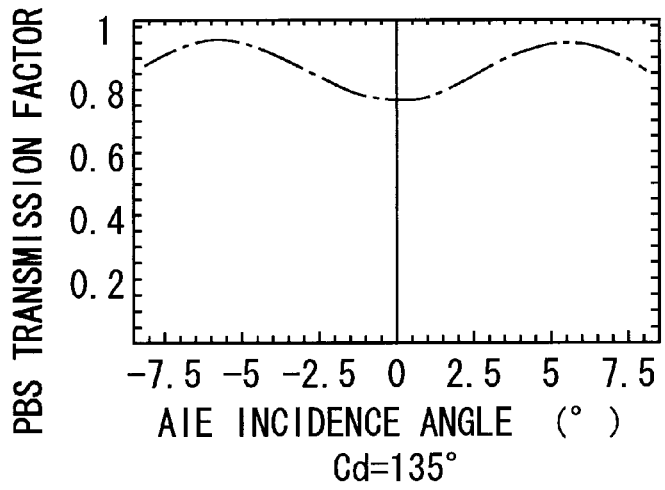
Figure 24C:
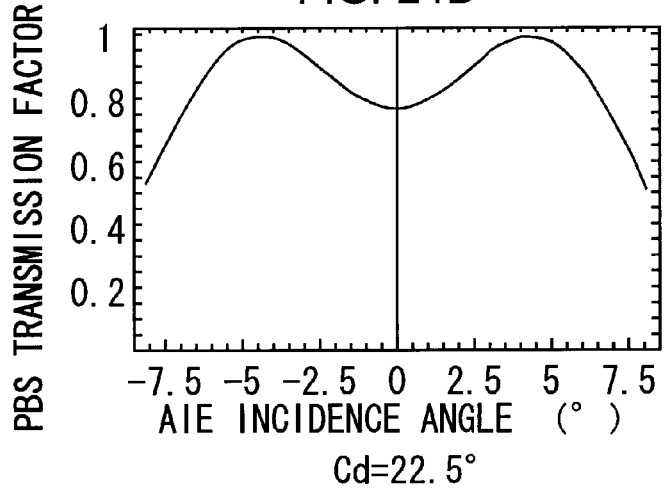

In FIG. 23, which corresponds to FIG. 18, the incidence angle dependence of the PBS transmission factor when the beam azimuth Cd is changed every 22.5° is represented, and graphs when the beam azimuth Cd is 22.5°, 45°, and 135° are shown in FIG. 24A to FIG. 24C.

As can be seen from FIG. 24A to FIG. 24C, since the PBS transmission factor when the beam azimuth Cd=45° and the incidence angle Aie=±5° is approximately 95%, while the PBS transmission factor when the beam azimuth Cd=135° and the incidence angle Aie=±5° is approximately 95%, in case of setting the beam parallel azimuth Cdθ// to 45° similar to the first embodiment, while the rim intensity ratio of the beam parallel azimuth Cdθ// can be improved, as compared with the first embodiment, there is little difference with respect to rim intensity improvement effect in the beam perpendicular azimuth Cdθ⊥ being 135°, the effect of reducing the difference between light intensity distribution of the beam parallel azimuth Cdθ// and that of the beam perpendicular azimuth Cdθ⊥ becomes small.

Furthermore, since the PBS transmission factor is drastically lowered when the incidence angle Aie exceeds ±5°, in this case, it can be considered that the use within the incidence angle Aie=±5° is desirable. On the other hand, when the incidence angle Aie is approximately ±4°, by setting the beam azimuth Cd to 22.5°, the rim intensity ratio in the θ// direction can be significantly improved as compared with the case of setting the angle to 45°.

Quartz used for the polarization adjustment wavelength plate 34 is provided with the turning characteristics, and according to the crystal state, there exist right quartz provided with the right-handed turning characteristics and left quartz provided with the left-handed turning characteristics. In the polarization adjustment wavelength plate 34, as the sub wavelength plates 34Z, by combining the right quartz and left quartz, the symmetry of the incidence angle dependence of the phase differences Δ in the "+" direction is assured.

Figure 25:
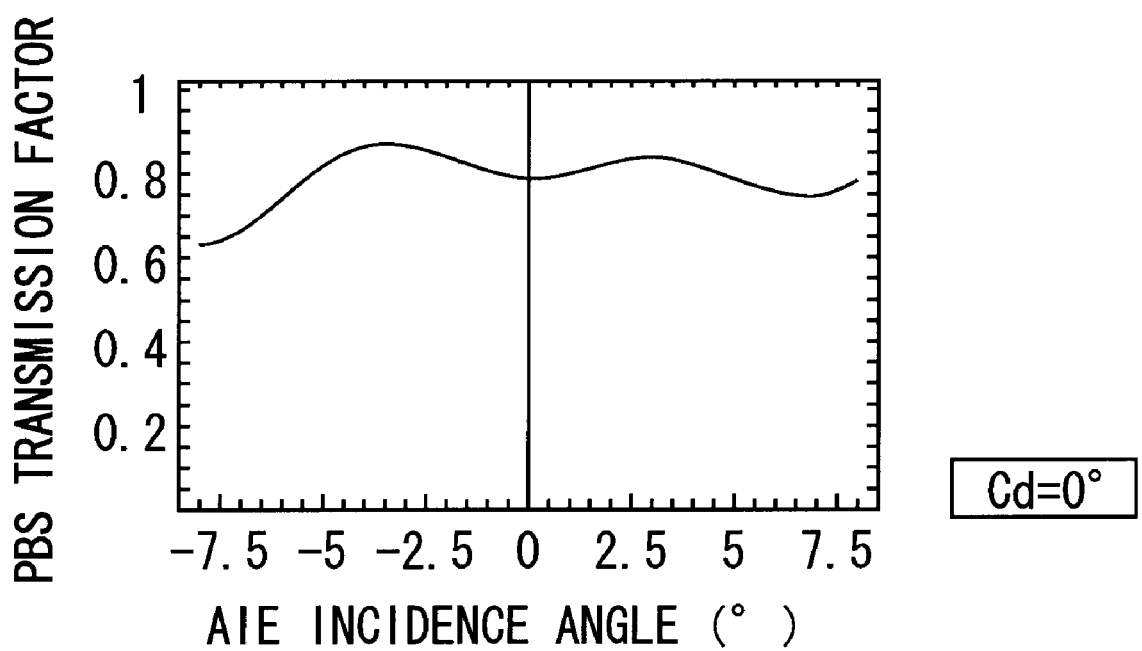
FIG. 25 shows a graph indicative of the relationship between the beam azimuth and the PBS transmission factor when combining two right quartz plates.

In FIG. 25, the PBS transmission factor with respect to the optical beam 40 when combining right quartz and right quartz is represented (in case of beam azimuth Cd=0°), and it can be seen that the symmetry is lost.

Being different from the combined wavelength plate 91, the half wavelength plate 33 (FIG. 22) is not configured by two plates made of crystal material put together, and is of the same configuration as the m-order half wavelength plate 90 which is configured by a single crystal material plate. In order to offset the wavelength dependence, while it is desirable that m=1 (phase difference Δ=3/2×λ is brought about), m=2 or more may be employed so as to improve the workability.

In the optical pickup 60, as the wavelength plate 30, total three plates made of crystal material (half wavelength plate 33 and two sub wavelength plates 34) have to be used, and the number of plates made of crystal material can be reduced as compared with the first embodiment which uses four plates made of crystal material (monolayer type wavelength plates 31A, 31B and first and second sub wavelength plate 32A, 32B), which can simplify the configuration.

(3) Third Embodiment

Figure 26:
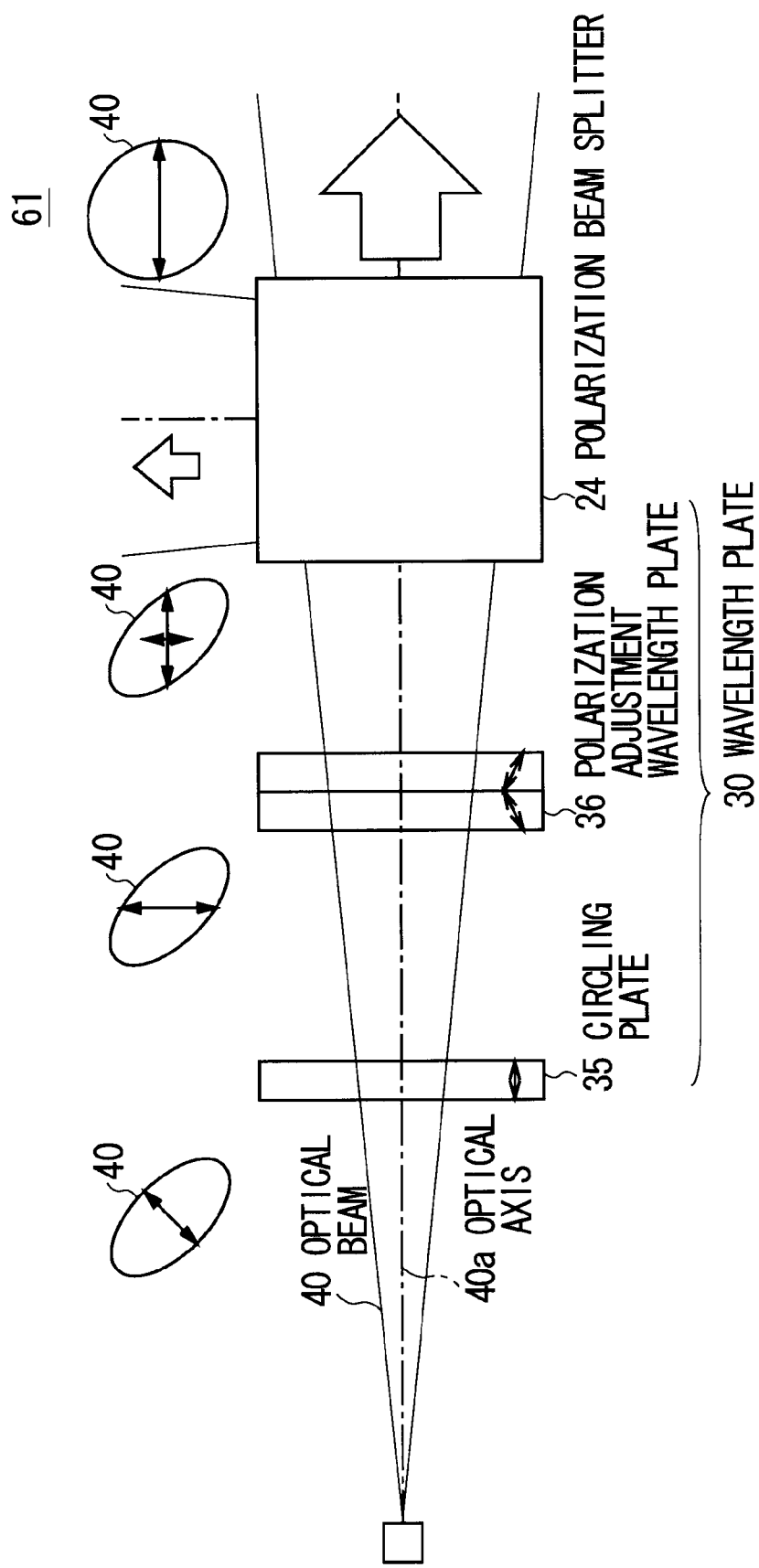
FIG. 26 shows a schematic view indicative of the configuration of an optical pickup of the third embodiment.

FIG. 26 to FIG. 28A, 28B show the third embodiment, and parts or components similar to those of the first embodiment shown in FIG. 1 to FIG. 21 are indicated with the same reference numerals. As shown in FIG. 26, an optical pickup 61 in this embodiment includes, as the wavelength plate 30, a circling plate 35 and a polarization adjustment wavelength plate 36. In FIG. 26, only the laser diode 1, wavelength plate 30, and PBS 24 are shown, and other optical parts or components are omitted for the sake of convenience. The configuration as the optical disc device 10 is similar to that shown in FIG. 4, and the explanation of which is omitted.

In the polarization adjustment wavelength plate 36, by making the crystal axis inclination angle Ø of a first sub wavelength plate 36A and a second sub wavelength plate 36B small, the incidence angle dependence of the phase difference Δ to be brought about in the optical beam 40 is largely expressed, and a phase difference Δ=480° is brought about at the central part of the optical beam 40 by setting the thickness "ta" and the thickness "ta" of the respective sub wavelength plates 36Z (first sub wavelength plate 36A and second sub wavelength plate 36B) is set to 0.15 mm, the phase difference Δ with respect to the beam center is set to 240°, and the crystal axis inclination angle Ø is set to ±25.8° (25.8° and 154.2°, respectively).

Figure 27:
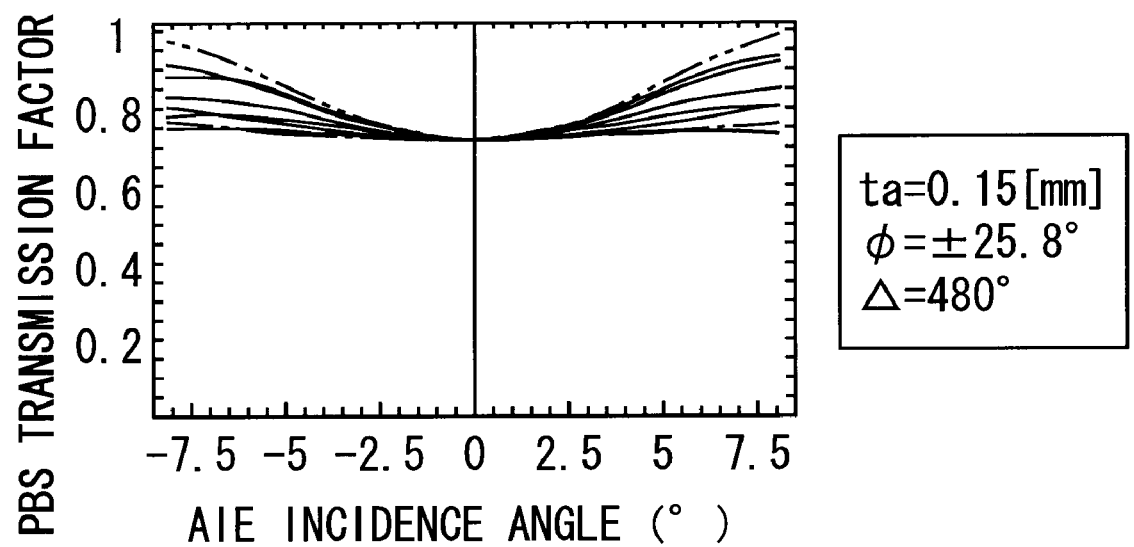
FIG. 27 shows a graph indicative of the relationship (1) between the beam azimuth and the PBS transmission factor of the third embodiment.
Figure 28A:
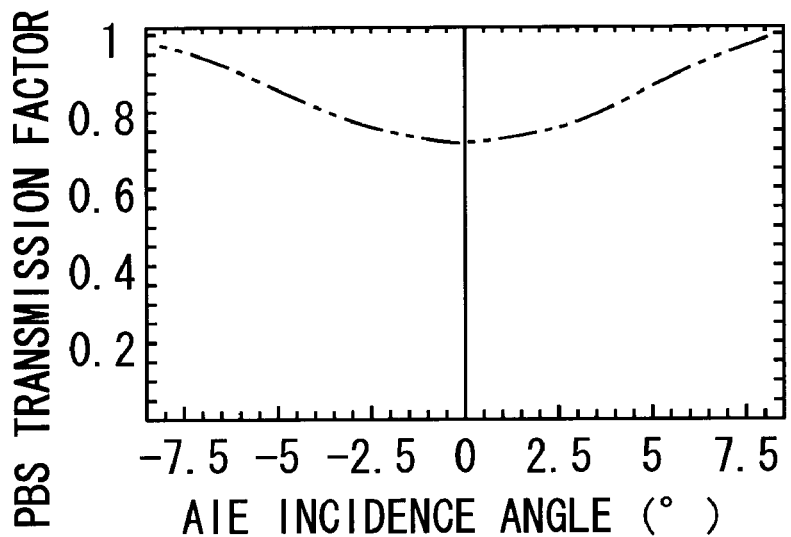
FIG. 28A and FIG. 28B show graphs indicative of the relationship (2) between the beam azimuth and the PBS transmission factor of the third embodiment.
Figure 28B:
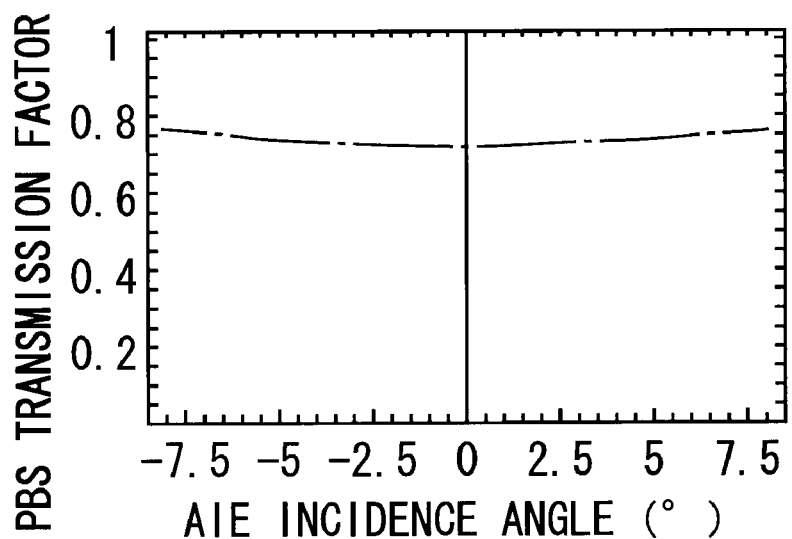

In FIG. 27, which corresponds to FIG. 18, the incidence angle dependence of the transmission factor of the PBS 24 with respect to the optical beam 40 when the beam azimuth Cd is changed every 22.5° is represented, and graphs when the beam azimuth Cd is 45°, and 135° are shown in FIG. 28A and FIG. 28B.

As can be seen from FIG. 28A and FIG. 28B, since the PBS transmission factor when the beam azimuth Cd=45° and the incidence angle Aie=±5° is approximately 85%, while the PBS transmission factor when the incidence angle Aie=0° is approximately 75%, and the PBS transmission factor when the incidence angle Aie=±5° is small as compared with the polarization adjustment wavelength plate 32 (FIG. 19B), when the beam parallel azimuth Cdθ// is set to 45°, the improvement effect of the rim intensity ratio of the beam parallel azimuth Cdθ// becomes small as compared with that in the first embodiment.

On the other hand, in FIG. 28A and FIG. 28B, the transmission factor is not lowered when the incidence angle Aie is ±7.5°, it can be considered that this embodiment is significantly effective when the incidence angle Aie exceeds, for example, ±5°.

The circling plate 35 (FIG. 26) is adapted to make the polarization direction of the optical beam 40 circle by setting the crystal axis inclination angle Acr to 0°. By adjusting the distance between the circling plate 35 and the polarization adjustment wavelength plate 36, the optical beam 40 has its polarization direction rotated by 45°, and is made to go to the polarization adjustment wavelength plate 36 as the S-polarization.

In the optical pickup 61, as the wavelength plate 30, total three plates made of crystal material (circling plate 35 and two sub wavelength plates 36Z) have to be used, and the number of plates made of crystal material can be reduced as compared with the first embodiment which uses four plates made of crystal material (monolayer type wavelength plates 31A, 31B and first and second sub wavelength plate 32A, 32B), which can simplify the configuration.

(4) Fourth Embodiment

FIG. 29 to FIG. 30A, 30B show the fourth embodiment, and parts or components similar to those of the first embodiment shown in FIG. 1 to FIG. 21 are indicated with the same reference numerals. An optical pickup 62, not shown, in this embodiment includes a polarization adjustment wavelength plate 37, not shown, instead of the polarization adjustment wavelength plate 32. The configuration as the optical disc device 10 is similar to that shown in FIG. 4, and the explanation of which is omitted for the sake of convenience.

In the polarization adjustment wavelength plate 37, by making the crystal axis inclination angle Ø of a first sub wavelength plate 37A and a second sub wavelength plate 37B small, the incidence angle dependence of the phase difference Δ to be brought about in the optical beam 40 is largely expressed, and a phase difference Δ=480° is brought about at the central part of the optical beam 40 by setting the thickness "ta", and the thickness "ta" of the respective sub wavelength plates 37Z (first sub wavelength plate 37A and second sub wavelength plate 37B) is set to 0.05 mm, the phase difference Δ with respect to the beam center is set to 240°, and the crystal axis inclination angle Ø is set to ±48.8° (48.8° and 131.2°, respectively).

Figure 29:
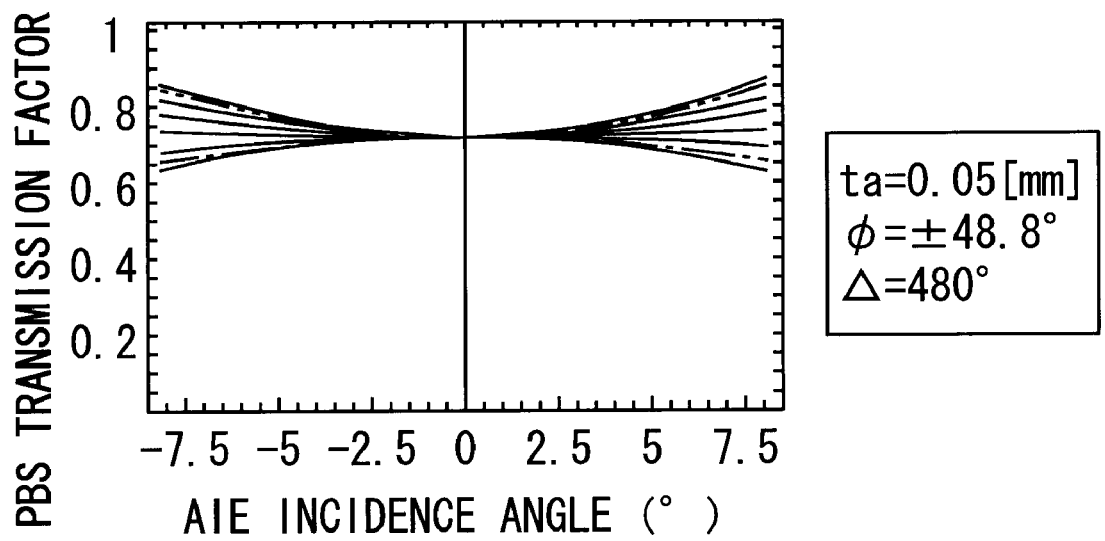
FIG. 29 shows a graph indicative of the relationship (1) between the beam azimuth and the PBS transmission factor of the fourth embodiment.
Figure 30A:
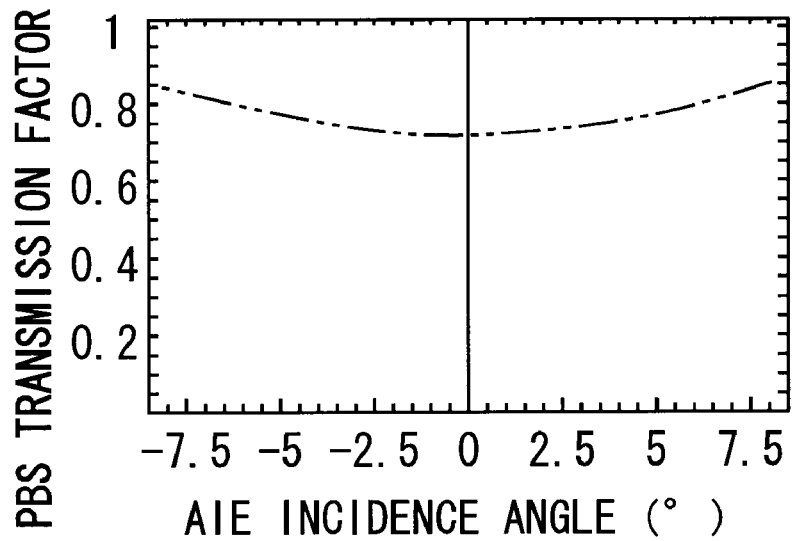
FIG. 30A and FIG. 30B show graphs indicative of the relationship (2) between the beam azimuth and the PBS transmission factor of the fourth embodiment.
Figure 30B:
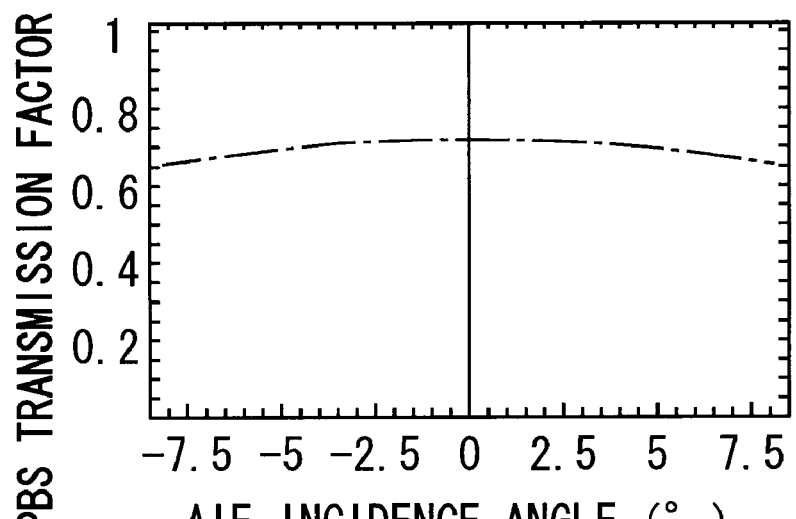

In FIG. 29, which corresponds to FIG. 18, the incidence angle dependence of the PBS transmission factor with respect to the optical beam 40 when the beam azimuth Cd is changed every 22.5° is represented, and graphs when the beam azimuth Cd is 45°, and 135° are shown in FIG. 30A and FIG. 30B.

As can be seen from FIG. 30A and FIG. 30B, since the PBS transmission factor when the beam azimuth Cd=45° and the incidence angle Aie=+5° is approximately 80%, while the PBS transmission factor when the beam azimuth Cd=135° and the incidence angle Aie=±5° is approximately 70%, the improvement effect of the rim intensity ratio of the beam parallel azimuth Cdθ// when the beam parallel azimuth Cdθ// is set to 45° and the incidence angle Aie=±5° is small.

On the other hand, in FIG. 30A and FIG. 30B, since the transmission factor is not lowered when the incidence angle Aie is ±7.5°, it can be considered that this embodiment is significantly effective when the incidence angle Aie exceeds, for example, ±7.5°. Furthermore, as a whole, since the transmission factor is low, this embodiment is effective when a large amount of the optical beam 40 going into the APC lens 22 is necessary.

(5) Fifth Embodiment

FIG. 31 to FIG. 32A, 32B show the fifth embodiment, and parts or components similar to those of the first embodiment shown in FIG. 1 to FIG. 21 are indicated with the same reference numerals. An optical pickup 63, not shown, in this embodiment includes a polarization adjustment wavelength plate 38, not shown, instead of the polarization adjustment wavelength plate 32. The configuration as the optical disc device 10 is similar to that shown in FIG. 4, and the explanation of which is omitted for the sake of convenience.

In the polarization adjustment wavelength plate 38, by making the crystal axis inclination angle Ø of a first sub wavelength plate 38A and a second sub wavelength plate 38B small, the incidence angle dependence of the phase difference Δ to be brought about in the optical beam 40 is largely expressed, and a phase difference Δ=460° is brought about at the central part of the optical beam 40 by setting the thickness "ta", and the thickness "ta" of the respective sub wavelength plates 38Z (first sub wavelength plate 38A and second sub wavelength plate 38B) is set to 0.5 mm, the phase difference Δ with respect to the beam center is set to 230°, and the crystal axis inclination angle Ø is set to ±13.5° (13.50° and 166.5°, respectively).

Figure 31:
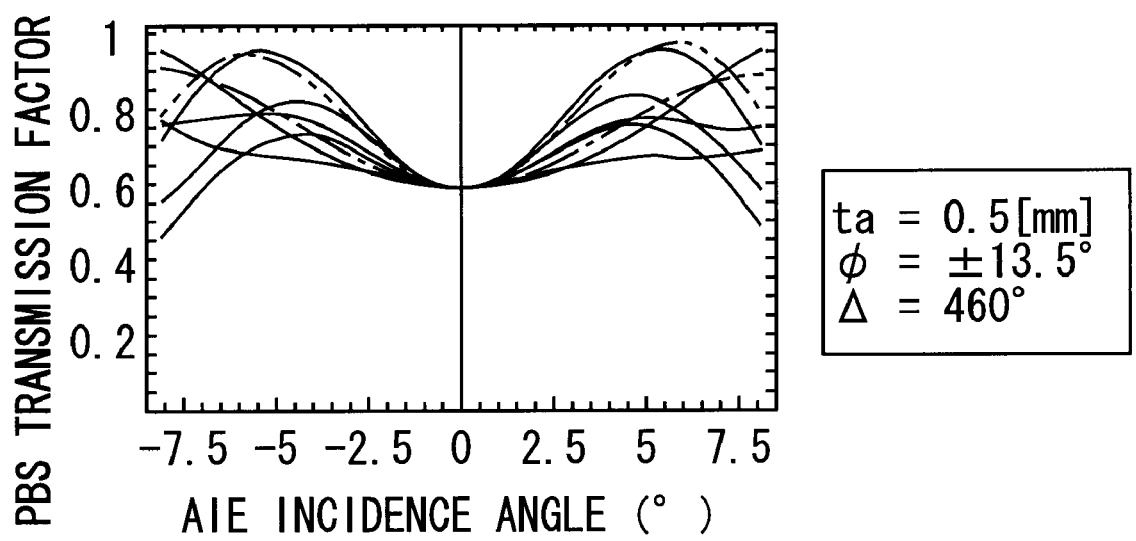
FIG. 31 shows a graph indicative of the relationship (1) between the beam azimuth and the PBS transmission factor of the fifth embodiment.
Figure 32A:
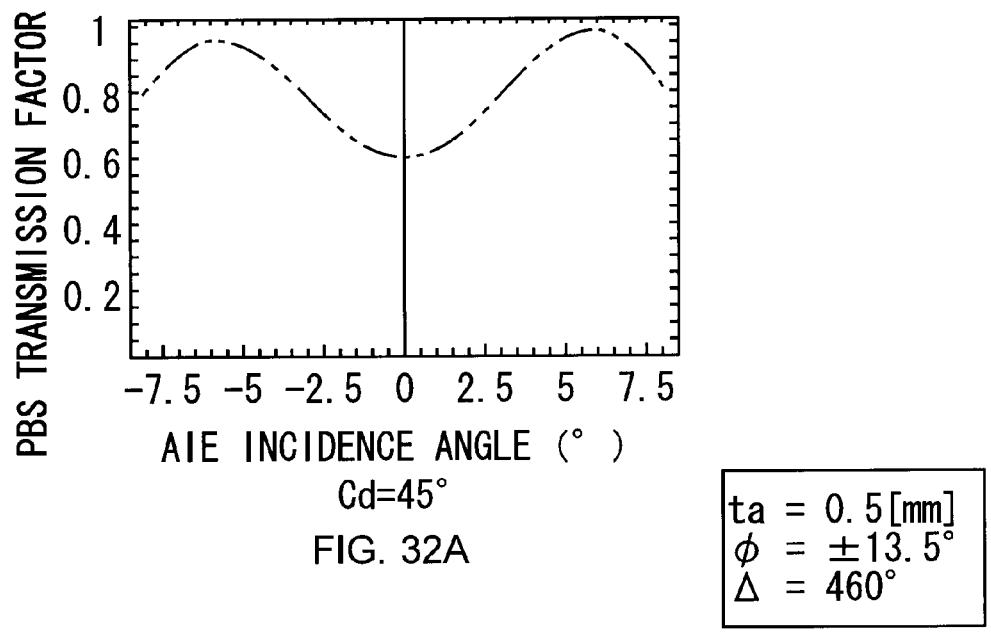
FIG. 32A and FIG. 32B show graphs indicative of the relationship (2) between the beam azimuth and the PBS transmission factor of the fifth embodiment.
Figure 32B:
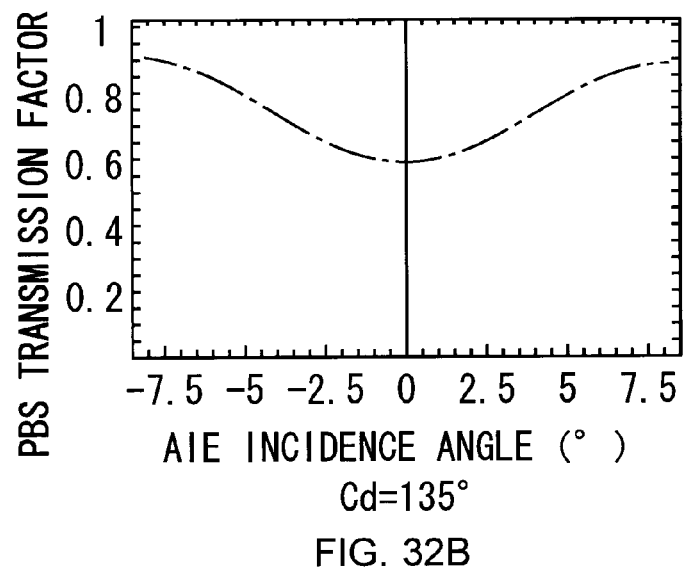

In FIG. 31, which corresponds to FIG. 18, the incidence angle dependence of the PBS transmission factor with respect to the optical beam 40 when the beam azimuth Cd is changed every 22.5° is represented, and graphs when the beam azimuth Cd is 45°, and 135° are shown in FIG. 32A and FIG. 32B.

As can be seen from FIG. 31, since the PBS transmission factor when the beam azimuth Cd=45° and the incidence angle Aie=±5° is approximately 95%, and the PBS transmission factor when the beam azimuth Cd=135° and the incidence angle Aie=±5° is approximately 80%, and further the PBS transmission factor when the incidence angle Aie=0° is approximately 60%, when the beam azimuth Cd is set to 45°, while the transmission factor of the optical beam 40 becomes small as compared with that in the first embodiment as a whole, the improvement effect of the rim intensity ratio of the beam parallel azimuth Cdθ// when the incidence angle Aie=±5° is large.

(6) Sixth Embodiment

FIG. 33 to FIG. 34A, 34B show the sixth embodiment, and parts or components similar to those of the first embodiment shown in FIG. 1 to FIG. 21 are indicated with the same reference numerals. An optical pickup 64, not shown, in this embodiment includes a polarization adjustment wavelength plate 39, not shown, instead of the polarization adjustment wavelength plate 32. The configuration as the optical disc device 10 is similar to that shown in FIG. 4, and the explanation of which is omitted for the sake of convenience.

In the polarization adjustment wavelength plate 39, by making the crystal axis inclination angle Ø of a first sub wavelength plate 39A and a second sub wavelength plate 39B small, the incidence angle dependence of the phase difference Δ to be brought about in the optical beam 40 is largely expressed, and a phase difference Δ=840° (720°+120°) is brought about at the central part of the optical beam 40 by setting the thickness "ta", and the thickness "ta" of the respective sub wavelength plates 39Z (first sub wavelength plate 39A and second sub wavelength plate 39B) is set to 0.8 mm, the phase difference Δ with respect to the beam center is set to 420°, and the crystal axis inclination angle Ø is set to ±14.5° (14.5° and 165.5°, respectively).

Figure 33:
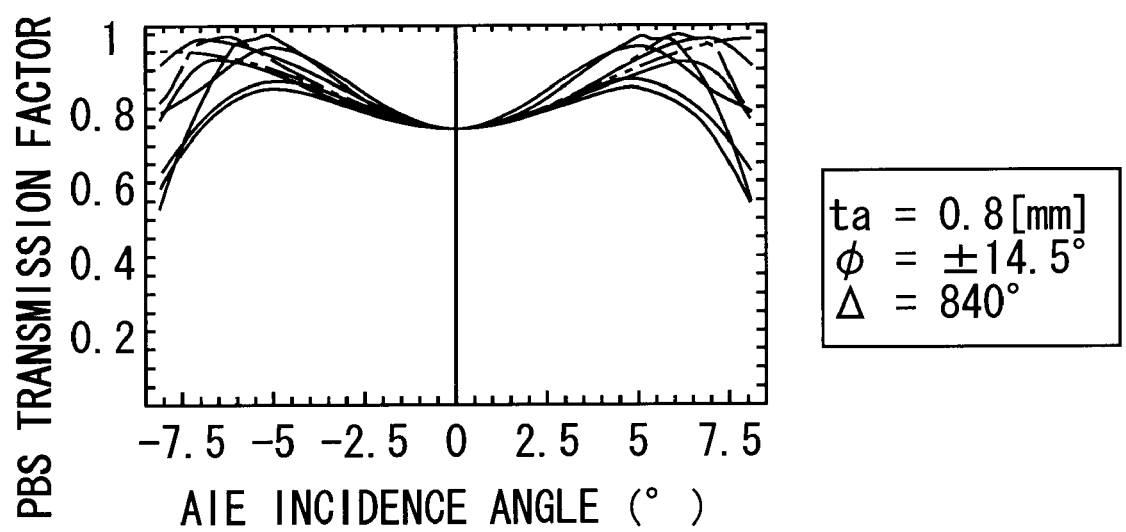
FIG. 33 shows a graph indicative of the relationship (1) between the beam azimuth and the PBS transmission factor of the sixth embodiment.
Figure 34A:
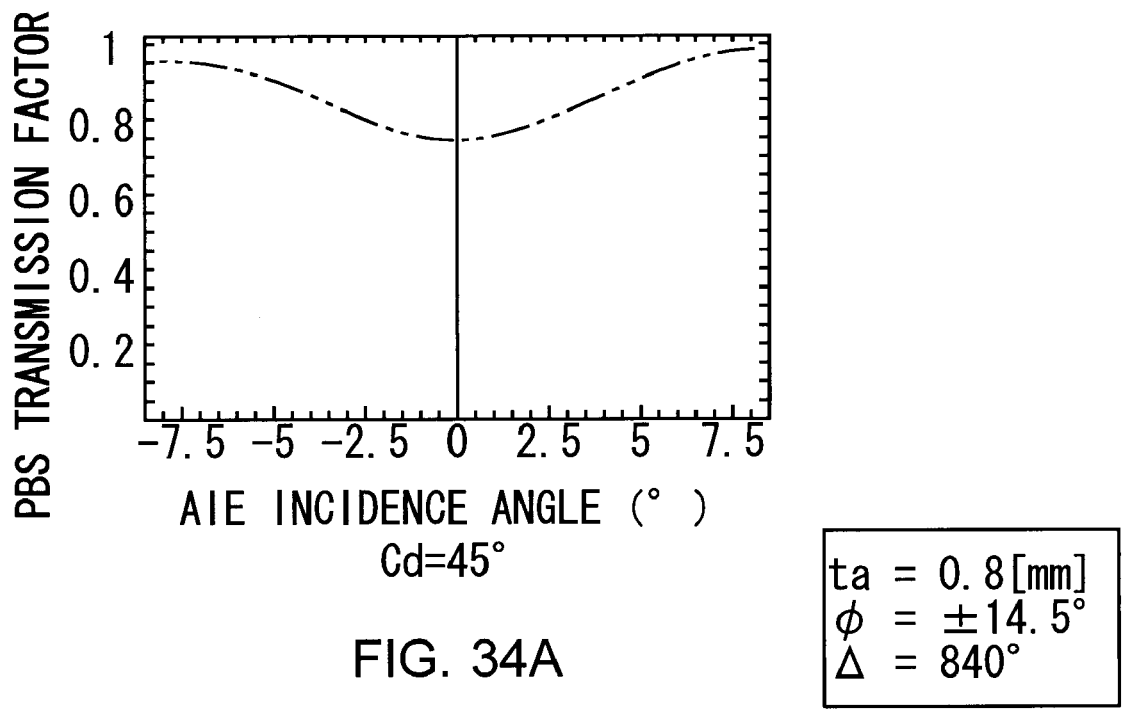
FIG. 34A and FIG. 34B show graphs indicative of the relationship (2) between the beam azimuth and the PBS transmission factor of the sixth embodiment.
Figure 34B:
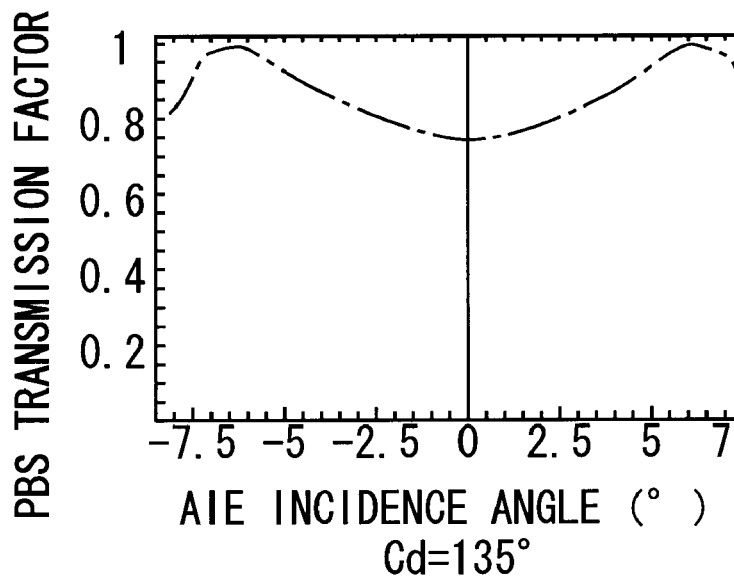

In FIG. 33, the incidence angle dependence of the PBS transmission factor with respect to the optical beam 40 when the beam azimuth Cd is changed every 22.5° is represented, and graphs when the beam azimuth Cd is 45°, and 135° are shown in FIG. 34A and FIG. 34B.

As can be seen from FIG. 34A and FIG. 34B, since the PBS transmission factor when the beam azimuth Cd=45° and the incidence angle Aie=±5° is approximately 95%, and the PBS transmission factor when the beam azimuth Cd=135° and the incidence angle Aie=±5° is approximately 80%, and further the PBS transmission factor when the incidence angle Aie=0° is approximately 60%, when the beam azimuth Cd is set to 45°, while the transmission factor of the optical beam 40 becomes small as compared with that in the first embodiment as a whole, the improvement effect of the rim intensity ratio of the beam parallel azimuth Cdθ// when the incidence angle Aie=±5° can be made large.

(7) Seventh Embodiment

FIG. 35 to FIG. 37A, 37B show the seventh embodiment, and parts or components similar to those of the first embodiment shown in FIG. 1 to FIG. 21 are indicated with the same reference numerals. An optical pickup 65, not shown, in this embodiment includes, as the wavelength plate 30, a half wavelength plate 41 and a polarization adjustment wavelength plate 42, not shown. The configuration as the optical disc device 10 is similar to that shown in FIG. 4, and the explanation of which is omitted for the sake of convenience.

In the polarization adjustment wavelength plate 42, by making the crystal axis inclination angle Ø of a first sub wavelength plate 42A and a second sub wavelength plate 42B small, the incidence angle dependence of the phase difference Δ to be brought about in the optical beam 40 is largely expressed, and a phase difference Δ=1200° (3×360°+120°) is brought about at the central part of the optical beam 40 by setting the thickness "ta", and the thickness "ta" of the respective sub wavelength plates 42Z (first sub wavelength plate 42A and second sub wavelength plate 42B) is set to 0.8 mm, the phase difference Δ with respect to the beam center is set to 600°, and the crystal axis inclination angle Ø is set to ±17.3° (17.30 and 162.7°, respectively).

Figure 35:
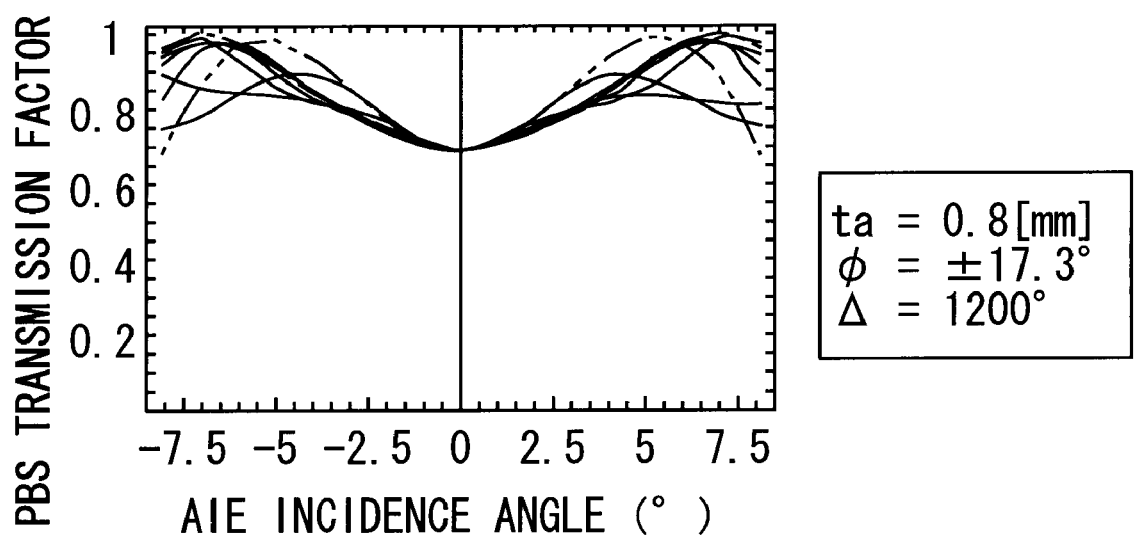
FIG. 35 shows a graph indicative of the relationship (1) between the beam azimuth and the PBS transmission factor of the seventh embodiment.
Figure 36A:
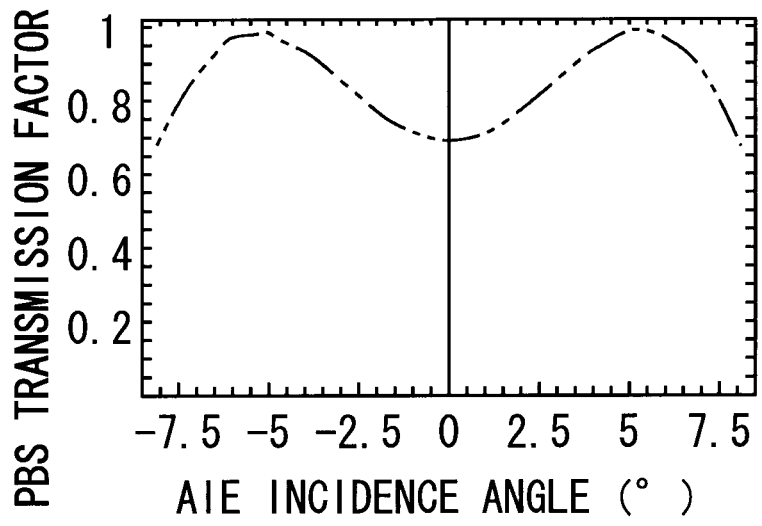
FIG. 36A and FIG. 36B show graphs indicative of the relationship (2) between the beam azimuth and the PBS transmission factor of the seventh embodiment.
Figure 36B:
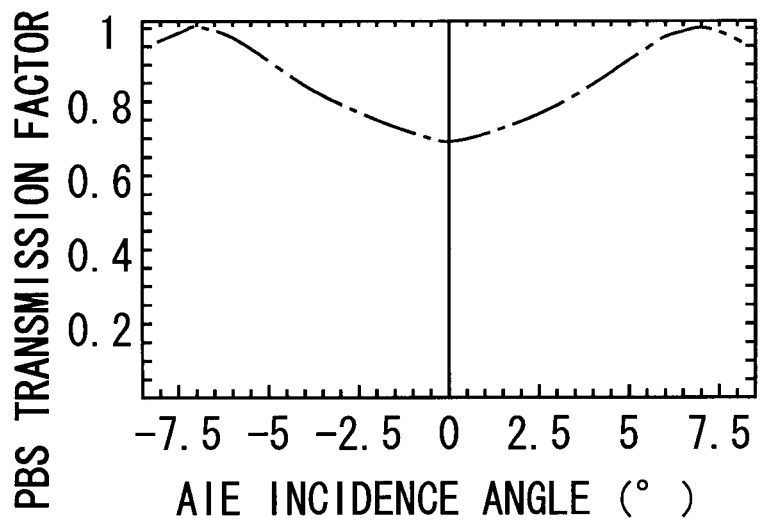

In FIG. 35, which corresponds to FIG. 18, the incidence angle dependence of the PBS transmission factor with respect to the optical beam 40 when the beam azimuth Cd is changed every 22.5° is represented, and graphs when the beam azimuth Cd is 45°, and 135° are shown in FIG. 36A and FIG. 36B.

As can be seen from FIG. 36A and FIG. 36B, since the PBS transmission factor when the beam azimuth Cd=45° and the incidence angle Aie=±5° is approximately 95%, and the PBS transmission factor when the beam azimuth Cd=135° and the incidence angle Aie=±5° is approximately 90%, and further the PBS transmission factor when the incidence angle Aie=0° is approximately 70%, when the beam azimuth Cd is set to 45°, the improvement effect of the rim intensity ratio of the beam parallel azimuth Cdθ// is large.

In FIG. 36A and FIG. 36B, when comparing the beam azimuth Cd=45° and the beam azimuth Cd=135°, since the difference in the PBS transmission factor at the beam rim is small, the effect of reducing the difference in light intensity distribution between the beam parallel azimuth Cdθ// and the beam perpendicular azimuth Cdθ⊥ is small.

Figure 37A:
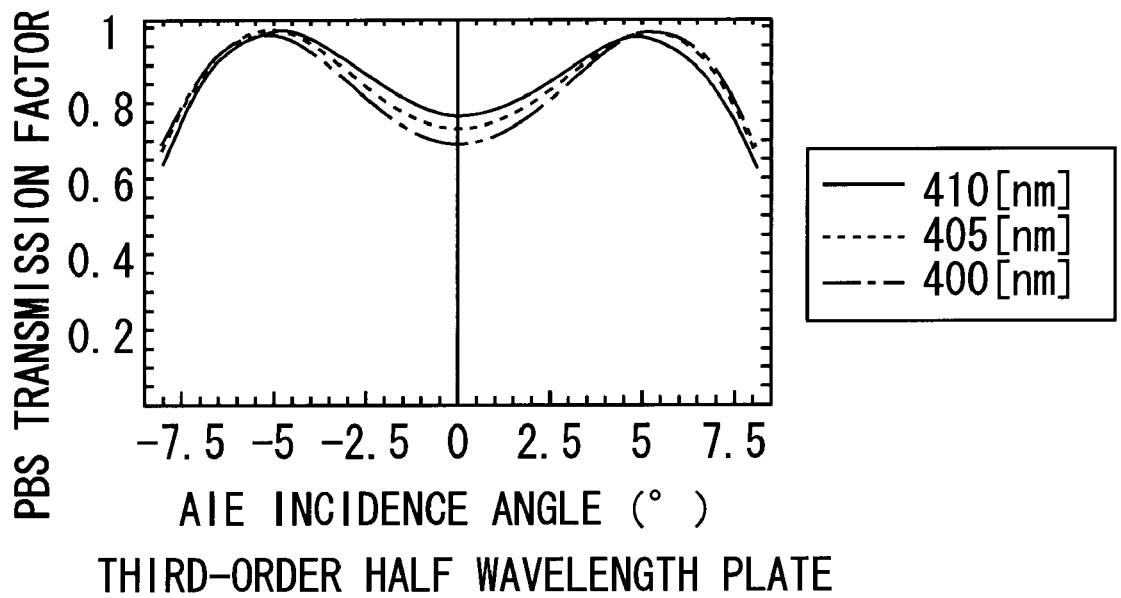
FIG. 37A and FIG. 37B show graphs indicative of the relationship between the beam azimuth and the PBS transmission factor to explain the order of the half wavelength plate and the wavelength dependence of the seventh embodiment.
Figure 37B:
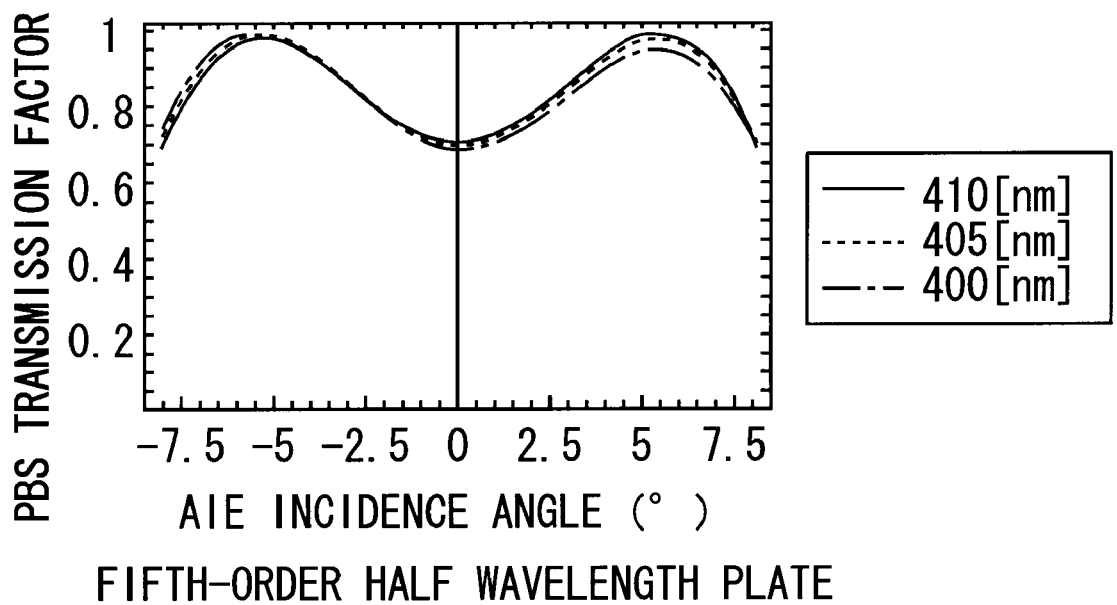

As shown in FIG. 37B, in the optical pickup 65, as the half wavelength plate 41, a fifth-order wavelength plate that brings about a phase difference Δ=5×360°+180°=1980° is employed, the wavelength dependence of the PBS transmission factor at the time of making the optical beam 40 of 405 and 405±5 nm go to the PBS 24 can be substantially offset.

In FIG. 37A, the case of employing a third-order wavelength plate as the half wavelength plate 41 is represented, which case indicates that the wavelength dependence of the polarization adjustment wavelength plate 42 with respect to the optical beam 40 is not sufficiently offset.

(8) Eighth Embodiment

FIG. 38 to FIG. 39A, 39B show the eighth embodiment, and parts or components similar to those of the first embodiment shown in FIG. 1 to FIG. 21 are indicated with the same reference numerals. An optical pickup 65, not shown, in this embodiment includes a polarization adjustment wavelength plate 43, not shown, instead of the polarization adjustment wavelength plate 32. The configuration as the optical disc device 10 is similar to that shown in FIG. 4, and the explanation of which is omitted for the sake of convenience.

In the polarization adjustment wavelength plate 43, by making the crystal axis inclination angle Ø of a first sub wavelength plate 43A and a second sub wavelength plate 43B small, the incidence angle dependence of the phase difference Δ to be brought about in the optical beam 40 is largely expressed, and a phase difference Δ=1200° (3×360°+120°) is brought about at the central part of the optical beam 40 by setting the thickness "ta", and the thickness "ta" of the respective sub wavelength plates 43Z (first sub wavelength plate 43A and second sub wavelength plate 43B) is set to 0.4 mm, the phase difference Δ with respect to the beam center is set to 600°, and the crystal axis inclination angle Ø is set to ±24.9° (24.9° and 155.1°, respectively).

Figure 38:
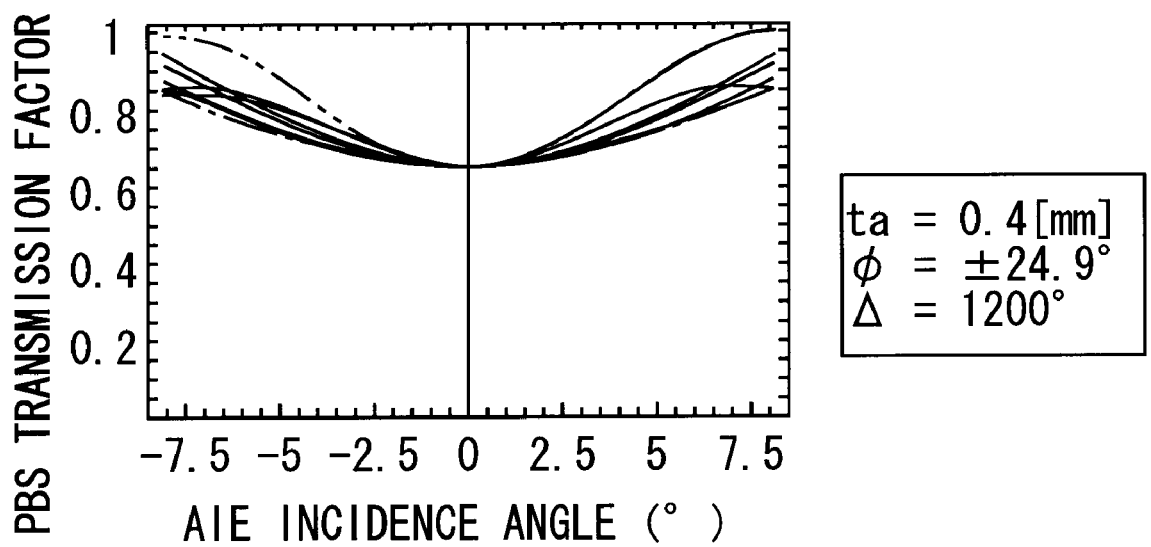
FIG. 38 shows a graph indicative of the relationship (1) between the beam azimuth and the PBS transmission factor of the eighth embodiment.
Figure 39A:
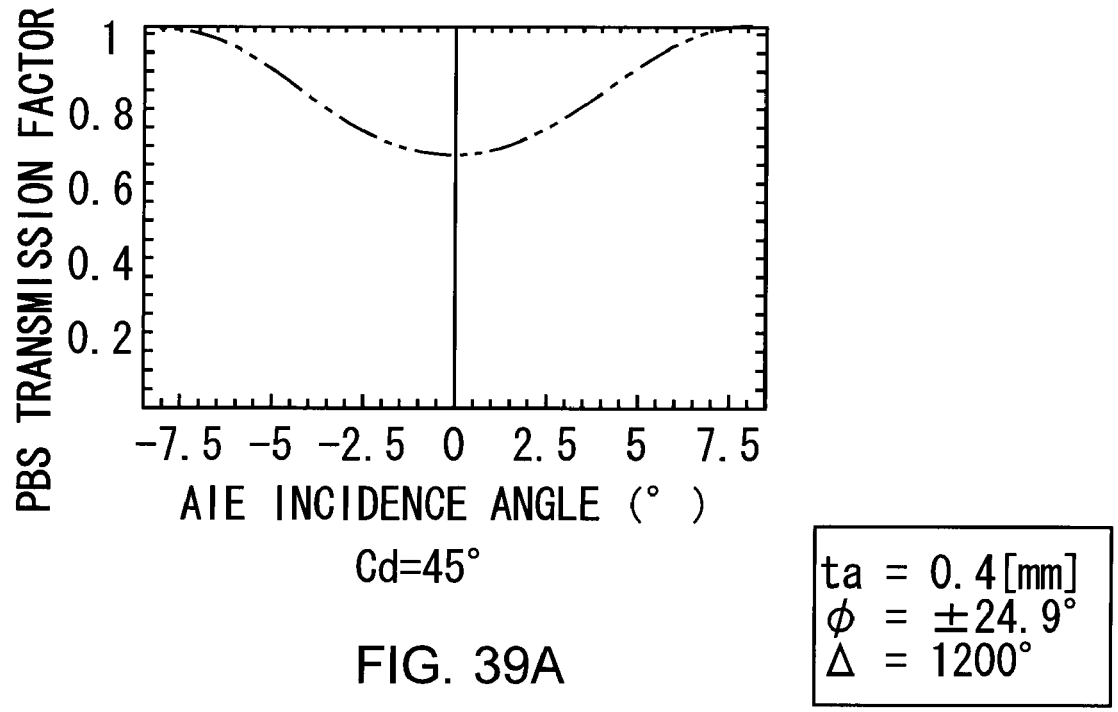
FIG. 39A and FIG. 39B show graphs indicative of the relationship (2) between the beam azimuth and the PBS transmission factor of the eighth embodiment.
Figure 39B:
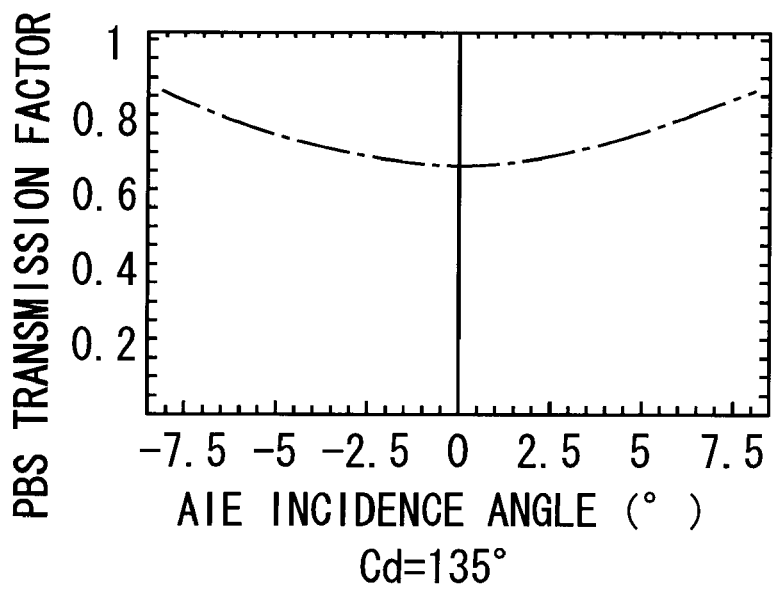

In FIG. 38, which corresponds to FIG. 18, the incidence angle dependence of the transmission factor of the PBS 24 with respect to the optical beam 40 when the beam azimuth Cd is changed every 22.5° is represented, and graphs when the beam azimuth Cd is 45°, and 135° are shown in FIG. 39A and FIG. 39B.

As can be seen from FIG. 39A and FIG. 39B, since the PBS transmission factor when the beam azimuth Cd=45° and the incidence angle Aie=5° is approximately 90%, and the PBS transmission factor when the beam azimuth Cd=135° and the incidence angle Aie=±5° is approximately 70%, and further the PBS transmission factor when the incidence angle Aie=0° is approximately 65%, when the beam parallel azimuth Cdθ// is set to 45°, while the improvement effect of the rim intensity ratio of the beam parallel azimuth Cdθ// in the optical beam 40 is made small, the transmission factor keeps going up as the incidence angle Aie becomes larger. Thus, this embodiment is effective when the incidence angle Aie is large (for example, when exceeding ±7°).

(9) Ninth Embodiment

FIG. 40 to FIG. 41A, 41B show the ninth embodiment, and parts or components similar to those of the first embodiment shown in FIG. 1 to FIG. 21 are indicated with the same reference numerals. An optical pickup 66, not shown, in this embodiment includes a polarization adjustment wavelength plate 44, not shown, instead of the polarization adjustment wavelength plate 32. The configuration as the optical disc device 10 is similar to that shown in FIG. 4, and the explanation of which is omitted for the sake of convenience.

In the polarization adjustment wavelength plate 44, by making the crystal axis inclination angle Ø of a first sub wavelength plate 44A and a second sub wavelength plate 44B small, the incidence angle dependence of the phase difference Δ to be brought about in the optical beam 40 is largely expressed, and a phase difference Δ=1200° (3×360°+120°) is brought about at the central part of the optical beam 40 by setting the thickness "ta", and the thickness "ta" of the respective sub wavelength plates 44Z (first sub wavelength plate 44A and second sub wavelength plate 44B) is set to 0.1 mm, the phase difference Δ with respect to the beam center is set to 600°, and the crystal axis inclination angle Ø is set to ±57.3° (57.3° and 122.7°, respectively).

Figure 40:
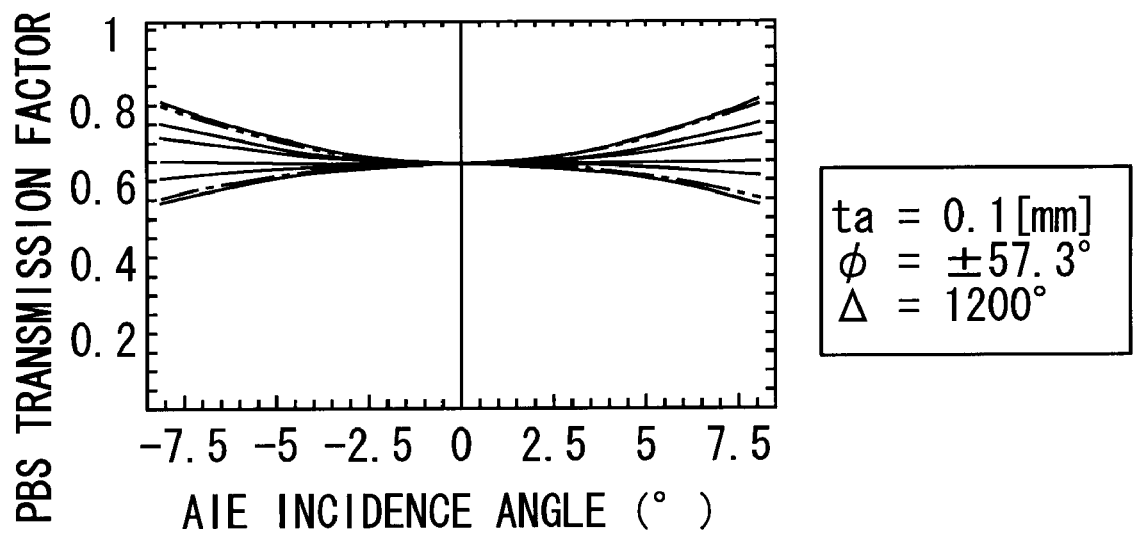
FIG. 40 shows a graph indicative of the relationship (1) between the beam azimuth and the PBS transmission factor of the ninth embodiment.
Figure 41A:
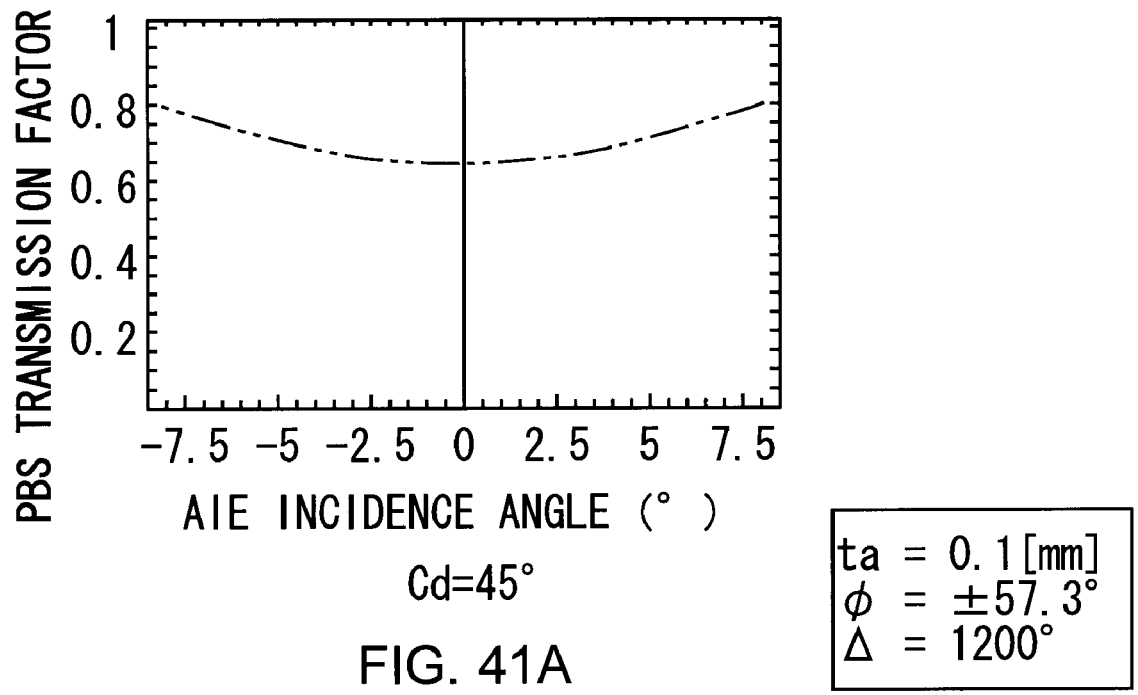
FIG. 41A and FIG. 41B show graphs indicative of the relationship (2) between the beam azimuth and the PBS transmission factor of the ninth embodiment.
Figure 41B:
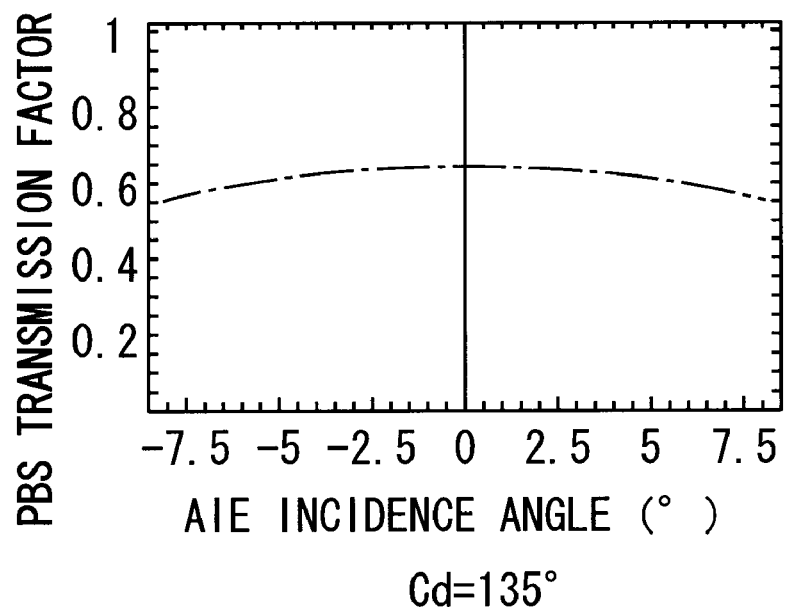

In FIG. 40, which corresponds to FIG. 18, the incidence angle dependence of the transmission factor of the PBS 24 with respect to the optical beam 40 when the beam azimuth Cd is changed every 22.5° is represented, and graphs when the beam azimuth Cd is 45°, and 135° are shown in FIG. 41A and FIG. 41B.

As can be seen from FIG. 41A and FIG. 41B, since the PBS transmission factor when the beam azimuth Cd=45° and the incidence angle Aie=±5° is approximately 75%, and the PBS transmission factor when the beam azimuth Cd=135° and the incidence angle Aie=±5° is approximately 60%, and further the PBS transmission factor when the incidence angle Aie=0° is approximately 65%, when the beam parallel azimuth Cdθ// is set to 45°, while the improvement effect of the rim intensity ratio of the beam parallel azimuth Cdθ// in the optical beam 40 is made small, the transmission factor keeps going up as the incidence angle Aie becomes larger. Thus, this embodiment is effective when the incidence angle Aie is large (for example, when exceeding ±7°).

(10) General Description

Hereinafter, the first to ninth embodiments will be generally explained. For the polarization adjustment wavelength plates 32 to 44, the same reference numeral "32" will be used for the sake of convenience.

In the polarization adjustment wavelength plate 32, by making the crystal axis inclination angle Ø of crystal material small (FIG. 23), the incidence angle dependence of the phase difference Δ can be largely expressed furthermore, and the PBS transmission factor with respect to the optical beam 40 at the incidence angle Aie=±5° can be increased.

In the polarization adjustment wavelength plate 32, when the crystal axis inclination angle Ø is set smaller than the maximum value of the incidence angle Aie of the optical beam 40 (that is, incidence angle Aie at the beam rim), since the characteristics of the incidence angle dependence are inverted in the "+" direction when exceeding the incidence angle Aie, desired incidence angle dependence is not obtained. Accordingly, it is desirable to set the crystal axis inclination angle Ø larger than the maximum value of the incidence angle Aie.

Furthermore, by making the crystal axis inclination angle Ø of the polarization adjustment wavelength plate 32 large (FIG. 27 and FIG. 29), the incidence angle dependence of the polarization adjustment wavelength plate 32 is lowered, and the transmission factor of the PBS 24 with respect to the optical beam 40 is prevented from coming down at the incidence angle Aie=±5° or more. Accordingly, desirable characteristics are obtained when the incidence angle Aie is large. When the crystal axis inclination angle Ø is made large, since the incidence angle dependence is gradually lowered, in order to obtain the improvement effect of the rim intensity ratio by expressing the incidence angle dependence of a certain degree, it is desirable to set the crystal axis inclination angle Ø to 60° or lower.

Accordingly, using the incidence angle Aie and aspect ratio of the optical beam 40, crystal axis inclination angle Ø can be arbitrarily selected.

Furthermore, by reducing the phase difference Δ to be brought about at the beam center from 480° to 460° using the polarization adjustment wavelength plate 32 (FIG. 31), the PBS transmission factor with respect to the optical beam 40 can be totally lowered.

On the other hand, by enlarging the phase difference Δ to be brought about at the beam center (set close to 360°+180°), the PBS transmission factor at the beam center can be improved. For example, by making the crystal axis inclination angle Ø large to make the incidence angle dependence of the phase difference Δ to be brought about in the optical beam 40 small, by setting the phase difference Δ to be brought about in the beam center large (for example, phase difference Δ=360°+150°), moderate improvement effect of the rim intensity ratio can be obtained, and the light use efficiency of the optical beam 40 can be improved.

Furthermore, by forming the polarization adjustment wavelength plate 32 not as the first order (phase difference Δ=360°+120°) but as the second order or third order (phase difference Δ=m×360°+120°) (FIG. 33 and FIG. 35), the incidence angle dependence of the phase difference Δ to be brought about in the optical beam 40 can be largely expressed furthermore, and the PBS transmission factor with respect to the optical beam 40 at the incidence angle Aie=±5° can be increased. Also in this case, when changing the crystal axis inclination angle Ø (FIG. 38 and FIG. 40), effect similar to the case of forming the polarization adjustment wavelength plate 32 as the first order can be obtained.

Accordingly, by arbitrarily selecting the crystal axis inclination angle Ø and thickness "ta" according to various factors such as the incidence angle Aie at the beam rim or necessary light amount as APC detection light, it becomes possible to form the polarization adjustment wavelength plate 32 provided with desired characteristics.

In the polarization adjustment wavelength plate 32, since the phase difference Δ at the beam center is different from that at the beam rim, while there is raised spherical aberration, this spherical aberration is not a problem actually. This spherical aberration can be eliminated by additionally arranging a compensation unit to the optical pickup 20.

(11) Other Embodiments

Figure 42A:
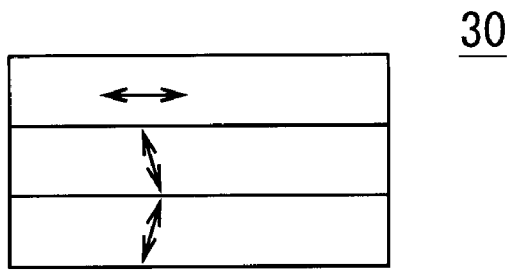
FIG. 42A and FIG. 42B show schematic views indicative of the configurations of polarization adjustment wavelength plates of other embodiments.
Figure 42B:
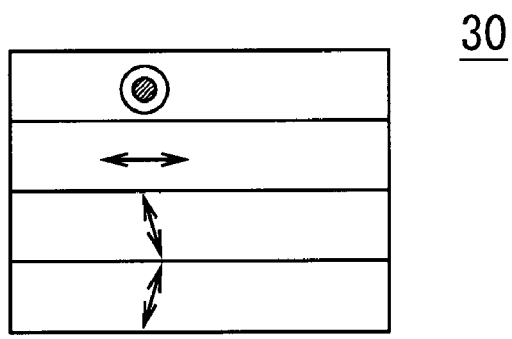

In above described embodiments, the half wavelength plate 31 and the polarization adjustment wavelength plate 32 are separately formed, to which the present invention is not restricted, and, as shown in FIG. 42A, the half wavelength plate 33 and polarization adjustment wavelength plate 34 used in FIG. 22 may be formed as the single wavelength plate 30, or, as shown in FIG. 42B, the half wavelength plate 31 and polarization adjustment wavelength plate 32 used in FIG. 7 may be formed as the single wavelength plate 30.

Figure 43:
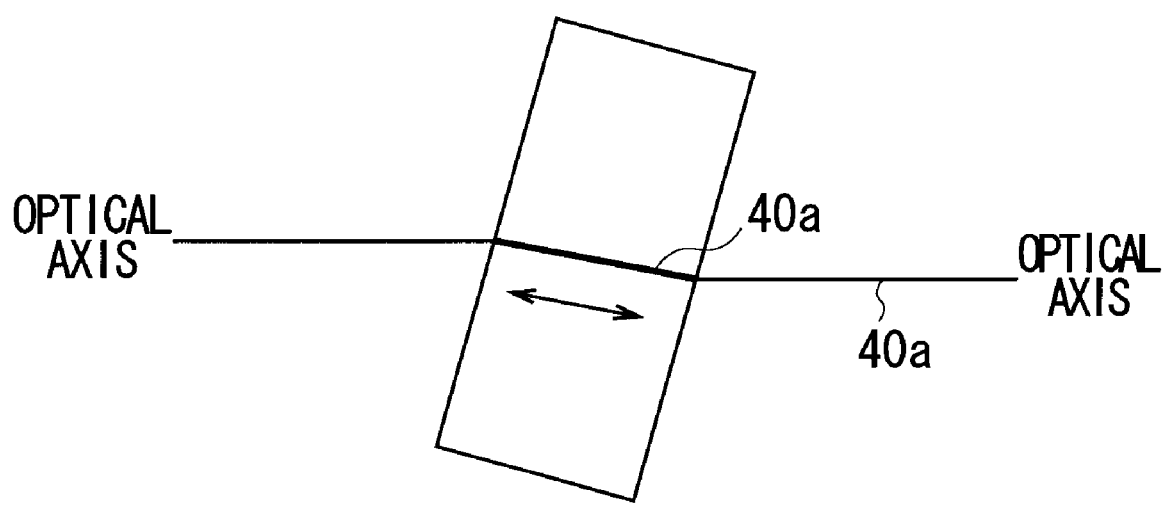
FIG. 43 shows a schematic view to explain the arrangement of a polarization adjustment wavelength plate of another embodiment.

In above described embodiment, the crystal axis inclination angle Ø is set to a predetermined angle by inclining the crystal axis with respect to the incidence side plane of the polarization adjustment wavelength plate 32, to which the present invention is not restricted, and, as shown in FIG. 43, the crystal axis inclination angle Ø of the polarization adjustment wavelength plate 32 may be set up by forming the polarization adjustment wavelength plate 32 such that the crystal axis is perpendicular to the incidence side plane, and inclining the polarization adjustment wavelength plate 32 itself with respect to the optical axis 40a. In this case, due to the refraction at the time of incidence and emission of the optical beam 40, the optical axis 40a comes to be inclined as shown in FIG. 43, and an angle formed by thus inclined optical axis 40a and the crystal axis is set to the crystal axis inclination angle Ø.

Furthermore, in above-described embodiment, the crystal axis azimuth Ccr of the first sub wavelength plate 32A and that of the second sub wavelength plate 32B are set identical, to which the present invention is not restricted, and by making the crystal axis azimuth Ccr of the first sub wavelength plate 32A perpendicular to that of the second sub wavelength plate 32B, the incidence angle dependence of the above-described slow axis azimuth is not changed according to the beam azimuth Cd. Accordingly, it becomes possible to improve only the rim intensity ratio of the optical beam 40 whose figuration is a perfect circle. In this case, the P-polarization is made to be emitted by making the P-polarization go to the polarization adjustment wavelength plate 32, and the phase difference Δ is brought about at the beam center by a difference value using the first sub wavelength plate 32A or second sub wavelength plate 32B, and the thickness difference δt. At this time, while it can be considered that the phase differences Δ becomes asymmetric in the "±" direction of the incidence angle Aie according to the thickness difference δt, the asymmetry of the phase difference Δ can be improved by adjusting the crystal axis inclination angle Ø to set it asymmetric with respect to the optical axis 40a.

Moreover, in above-described embodiment, the thickness "ta" of the first sub wavelength plate 32A and that of the second sub wavelength plate 32B are set identical, to which the present invention is not restricted, and the similar effect obtained by the polarization adjustment wavelength plate 32 in the above-described first embodiment can be obtained by adjusting the thickness "ta" so long as the crystal axis inclination angle Ø of the first sub wavelength plate 32A and that of the second sub wavelength plate 32B are oppositely directed with respect to the Z-axis. For example, the thickness "ta" of the first sub wavelength plate 32A is set double the thickness "ta" of the second sub wavelength plate 32B, and the absolute value of the crystal axis inclination angle Ø of the first sub wavelength plate 32A is set half the absolute value of the crystal axis inclination angle Ø of the second sub wavelength plate 32B.

Yet moreover, in above-described embodiment, the polarization adjustment wavelength plate 32 is made to function similarly as the half wavelength plate in which the polarization direction is inverted with respect to the crystal axis, to which the present invention is not restricted, and there may be employed a configuration in which, by adjusting only the ratio of the P-polarization and S-polarization of the incoming optical beam 40 of the P-polarization, the most part of the optical beam 40 is made to be emitted as the P-polarization.

Yet moreover, in above-described embodiment, in the polarization adjustment wavelength plate 32 which is made to function similarly as the 180° wavelength plate, the difference value of the phase difference Δ from a design value (180°) is set to 60°, to which the present invention is not restricted, and the difference value can be arbitrarily selected in the range of 5° to 100° depending on the size of the incidence angle dependence and the rim intensity ratio of the optical beam 40. In case the difference value is less than 5°, the improvement effect of the rim intensity ratio is scarcely obtained, while in case the difference value is more than 100°, the characteristics necessary for the polarization adjustment wavelength plate 32 (for example, characteristics as a half wavelength plate) are undesirably changed.

Yet moreover, in above-described embodiment, the beam parallel azimuth Cdθ// is set to 45°, to which the present invention is not restricted, and the beam parallel azimuth Cdθ// can be arbitrarily selected according to various factors such as the figuration of the optical beam 40, necessary improvement effect of the rim intensity ratio, reduction ratio of the rim intensity RM of the beam perpendicular azimuth Cdθ⊥ with respect to the beam parallel azimuth Cdθ//, etc.

Yet moreover, in above-described embodiment, the optical beam 40 of the P-polarization which is made to transmit through the PBS 24 is directed to the objective lens 27, to which the present invention is not restricted, and the optical beam 40 of the S-polarization reflected by the PBS 24 may be directed to the objective lens 27. In this case, by setting the ratio of the S-polarization at the beam center smaller than the ratio of the S-polarization at the beam rim, the polarization adjustment wavelength plate 32 can form the figuration of the optical beam 40 directed to the objective lens 27.

Yet moreover, in above-described embodiment, the polarization adjustment wavelength plate 32 is configured by two plates made of crystal material or the first sub wavelength plate 32A and second sub wavelength plate 32B, to which the present invention is not restricted, and the single first sub wavelength plate 32A may be used as the polarization adjustment wavelength plate, or three or more sub wavelength plates 32Z may combined to be used.

Yet moreover, in above-described embodiment, as the first sub wavelength plate 32A and second sub wavelength plate 32B, right quartz and left quartz are combined to be used, to which the present invention is not restricted, right quartz and right quartz, or left quartz and left quartz may be combined to be used, or materials other than quartz may be used as crystal material.

Yet moreover, in above-described embodiment, as crystal material used for the polarization adjustment wavelength plate 32, quartz which is uniaxial crystal is used, to which the present invention is not restricted, and biaxial crystal may be used. In this case, while there are two directions which do not represent the birefringence, since these two directions form a shallow angle, by setting the center line of the two directions to the crystal axis, this biaxial crystal can be used as the polarization adjustment wavelength plate 32.

Yet moreover, in above-described embodiment, the half wavelength plate 31 and polarization adjustment wavelength plate 32 are arranged such that the crystal axis azimuth Ccr of the half wavelength plate 31 is set within the range of 90°+45° with respect to the crystal axis azimuth Ccr of the polarization adjustment wavelength plate 32, to which the present invention is not restricted, and the crystal axis azimuth Ccr of the half wavelength plate 31 does not necessarily have to be arranged in this range.

Yet moreover, in above-described embodiment, the order "m" of the half wavelength plate 31 is so set up as to offset the wavelength dependence of the polarization adjustment wavelength plate 32, to which the present invention is not restricted, and the order "m" may be set up irrespective of the polarization adjustment wavelength plate 32.

Yet moreover, in above-described embodiment, the optical beam 40 of the S-polarization reflected by the PBS 24 is directed to the APC photodetector 23, to which the present invention is not restricted, and there may be employed a configuration in which the reflected optical beam 40 is not used.

Yet moreover, in above-described embodiment, a blue laser beam of 405 nm is used as the optical beam 40, to which the present invention is not restricted, and the optical beam 40 of various wavelengths according to the format of the optical disc 100 may be used.

Yet moreover, in above-described embodiment, the polarization adjustment wavelength plate 32 according to an embodiment of the present invention is applied to the optical disc device 10 having the optical pickup 20, to which the present invention is not restricted, and the polarization adjustment wavelength plate 32 may be used in various optical devices which use light irradiated from a light source such as a projector.

Yet moreover, in above-described embodiment, the optical pickup 20 as an optical pickup includes the laser diode 1 as a light source, polarization adjustment wavelength plate 32 as a polarization adjustment plate, PBS 24 as a polarization beam splitter, objective lens 27 as an objective lens, to which the present invention is not restricted, and the optical pickup according to an embodiment of the present invention may include a light source, a polarization adjustment plate, a polarization beam splitter, and an objective lens of other various configurations.

The present invention can be utilized for various electronic equipments on which an optical disc device or an optical device is mounted.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a light source that irradiates an optical beam being a divergent beam;
a polarization adjustment plate made of crystal material provided with the birefringence, in which the crystal axis, along which direction the birefringence is not brought about, is so arranged as to be turned up from an orthogonal plane perpendicular to the optical axis of the optical beam to express the incidence angle dependence which the crystal material is provided with, and the thickness with respect to the optical axis is set up such that the phase difference to be brought about at the central part of the optical beam becomes low from a desired design value to make the optical beam emitted as a first linear polarization by a predetermined difference value, and which adjusts the ratio of the first linear polarization and a second linear polarization perpendicular to the first linear polarization such that the ratio of the first linear polarization at the rim part of the optical beam comes to be higher than that at the central part of the optical beam;
a polarization beam splitter that splits off the first linear polarization and the second linear polarization in the adjusted optical beam; and
an objective lens that condenses the first linear polarization, and makes the condensed first linear polarization go to an optical disc.

2. The optical pickup according to claim 1, wherein
the polarization adjustment plate is formed by two sub wavelength plates, and
the two sub wavelength plates have their crystal axes projected to an orthogonal plane perpendicular to the optical axis set parallel with each other, and have their angles of the crystal axes with respect to the optical axis set symmetric with respect to the optical axis, and further have their thicknesses of the crystal material with respect to the optical axis set identical.

3. The optical pickup according to claim 2, wherein
the crystal material is provided with the circling property, and
the polarization adjustment plate is formed by the combined sub wavelength plates provided with the circling properties which are reverse directions with respect to one another.

4. The optical pickup according to claim 1, wherein
the light source is a laser diode that irradiates the optical beam such that the divergence angle of a first direction perpendicular to the optical axis direction becomes maximum, while the divergence angle of a second direction perpendicular to the optical axis direction and the first direction becomes minimum, and is arranged such that the ratio of the first linear polarization at the rim part of the optical beam in the second direction comes to be larger than the ratio of the first linear polarization at the rim part of the optical beam in the first direction.

5. The optical pickup according to claim 1, wherein,
in the polarization adjustment plate, a value which is obtained by adding a phase difference of the optical beam for one wavelength to the minimum phase difference which has to be brought about to make the optical beam emitted as a first linear polarization is set to the design value.

6. The optical pickup according to claim 1, wherein,
in the polarization adjustment plate, when "m" is a positive integer and "λ" is the wavelength of the optical beam, the design value is represented by $(m+½)×λ$.

7. The optical pickup according to claim 1, wherein,
in the polarization adjustment plate, when "λ" is the wavelength of the optical beam, the design value is represented by $½×λ$.

8. The optical pickup according to claim 1, further comprising:
a half wavelength plate that, by converting the polarization direction of the optical beam, makes the optical beam being the second linear polarization go to the polarization adjustment plate.

9. The optical pickup according to claim 8, wherein
the half wavelength plate is arranged such that the angle of the slow axis of the half wavelength plate when projected to the orthogonal plane is set within the range of 90°±45° with respect to the angle of the crystal axis of the polarization adjustment plate projected to the orthogonal plane so as to offset the wavelength dependence brought about by the polarization adjustment plate.

10. The optical pickup according to claim 9, wherein
the half wavelength plate is an m-order half wavelength plate, and the integer "m" is so selected as to offset the wavelength dependence brought about by the polarization adjustment plate.

11. The optical pickup according to claim 1, wherein
the polarization beam splitter directs the optical beam being the second linear polarization to an Auto Power Control (APC) photodetector.

12. An optical disc device comprising:
a light source that irradiates an optical beam being a divergent beam;
a light intensity control unit that controls the light intensity of the light source;
a polarization adjustment plate made of crystal material provided with the birefringence, in which the crystal axis, along which direction the birefringence is not brought about, is so arranged as to be turned up from an orthogonal plane perpendicular to the optical axis of the optical beam to express the incidence angle dependence which the crystal material is provided with, and the thickness with respect to the optical axis is set up such that the phase difference to be brought about at the central part of the optical beam becomes low from a desired design value to make the optical beam emitted as a first linear polarization by a predetermined difference value, and which adjusts the ratio of the first linear polarization and a second linear polarization perpendicular to the first linear polarization such that the ratio of the first linear polarization at the rim part of the optical beam comes to be higher than that at the central part of the optical beam;
a polarization beam splitter that splits off the first linear polarization and the second linear polarization in the adjusted optical beam; and
an objective lens that condenses the first linear polarization, and makes the condensed first linear polarization go to an optical disc.

13. A polarization adjustment plate made of crystal material provided with the birefringence, in which the crystal axis, along which direction the birefringence is not brought about, is so arranged as to be turned up from an orthogonal plane perpendicular to the optical axis of an incoming optical beam to express the incidence angle dependence which the crystal material is provided with, and the thickness with respect to the optical axis is set up such that the phase difference to be brought about at the central part of the optical beam becomes low from a desired design value to make the optical beam emitted as a first linear polarization by a predetermined difference value, and which adjusts the ratio of the first linear polarization and a second linear polarization perpendicular to the first linear polarization such that the ratio of the first linear polarization at the rim part of the optical beam comes to be higher than that at the central part of the optical beam.

14. An optical device comprising:
a light source that irradiates an optical beam being a divergent beam;
a polarization adjustment plate made of crystal material provided with the birefringence, in which the crystal axis, along which direction the birefringence is not brought about, is so arranged as to be turned up from an orthogonal plane perpendicular to the optical axis of the optical beam to express the incidence angle dependence which the crystal material is provided with, and the thickness with respect to the optical axis is set up such that the phase difference to be brought about at the central part of the optical beam becomes low from a desired design value to make the optical beam emitted as a first linear polarization by a predetermined difference value, and which adjusts the ratio of the first linear polarization and a second linear polarization perpendicular to the first linear polarization such that the ratio of the first linear polarization at the rim part of the optical beam comes to be higher than that at the central part of the optical beam; and
a polarization beam splitter that splits off the first linear polarization and the second linear polarization in the adjusted optical beam.

* * * * *